Nov. 17, 1959 J. W. OXBERRY 2,912,898
FILM GATE FOR COMBINED CAMERA AND PROJECTOR
Filed Jan. 22, 1954 11 Sheets-Sheet 1

Nov. 17, 1959  J. W. OXBERRY  2,912,898
FILM GATE FOR COMBINED CAMERA AND PROJECTOR
Filed Jan. 22, 1954  11 Sheets-Sheet 2
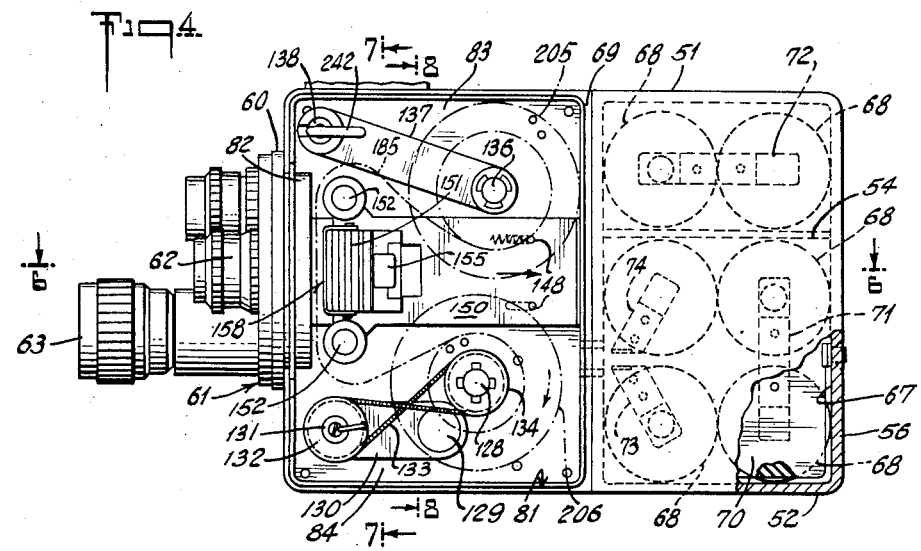
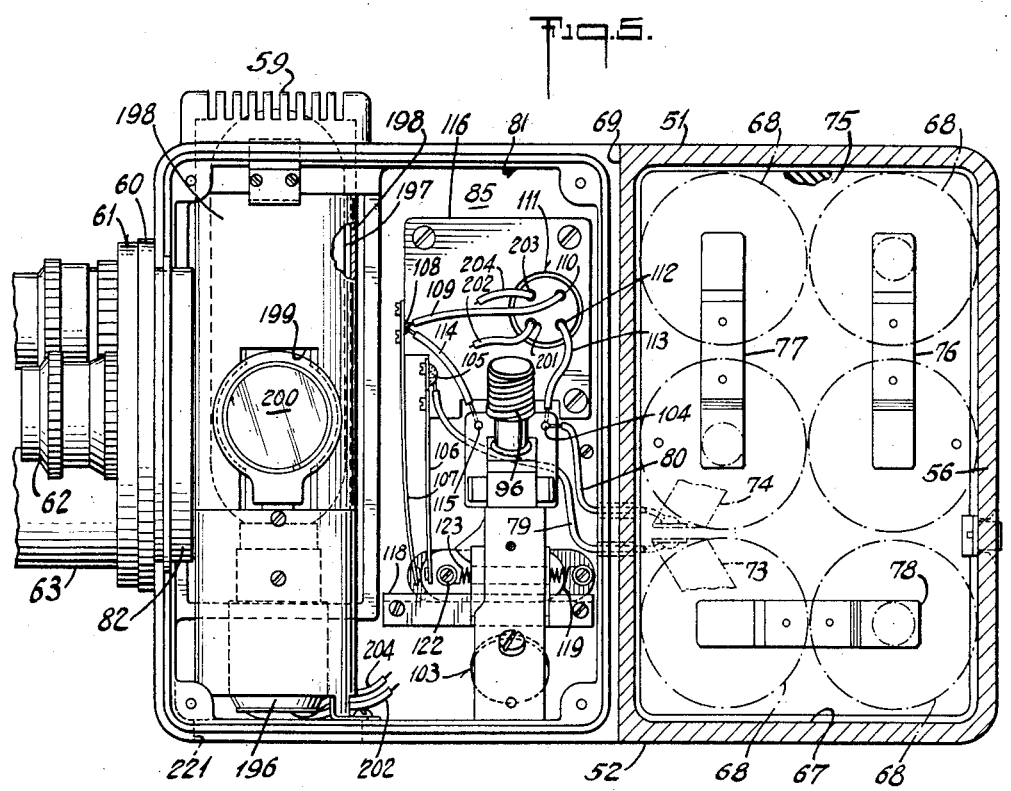

Nov. 17, 1959  J. W. OXBERRY  2,912,898
FILM GATE FOR COMBINED CAMERA AND PROJECTOR
Filed Jan. 22, 1954  11 Sheets-Sheet 3
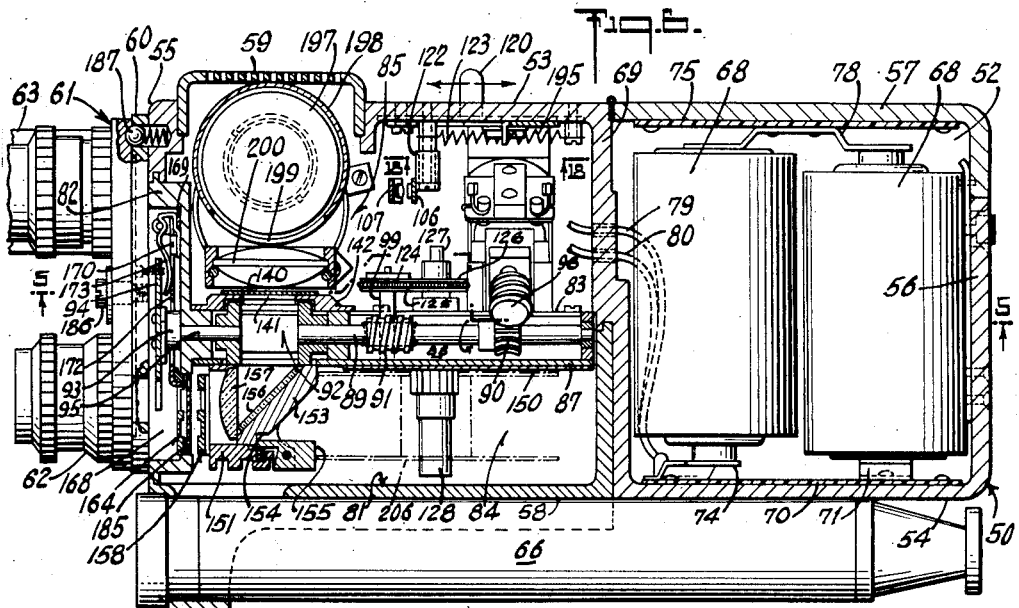
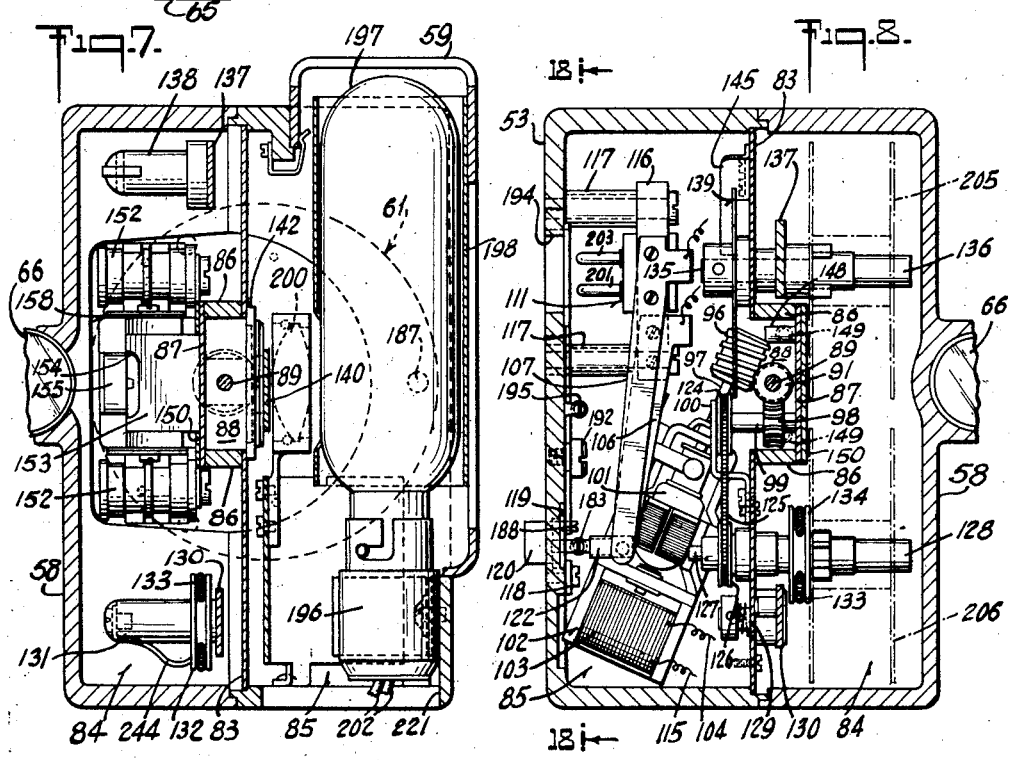

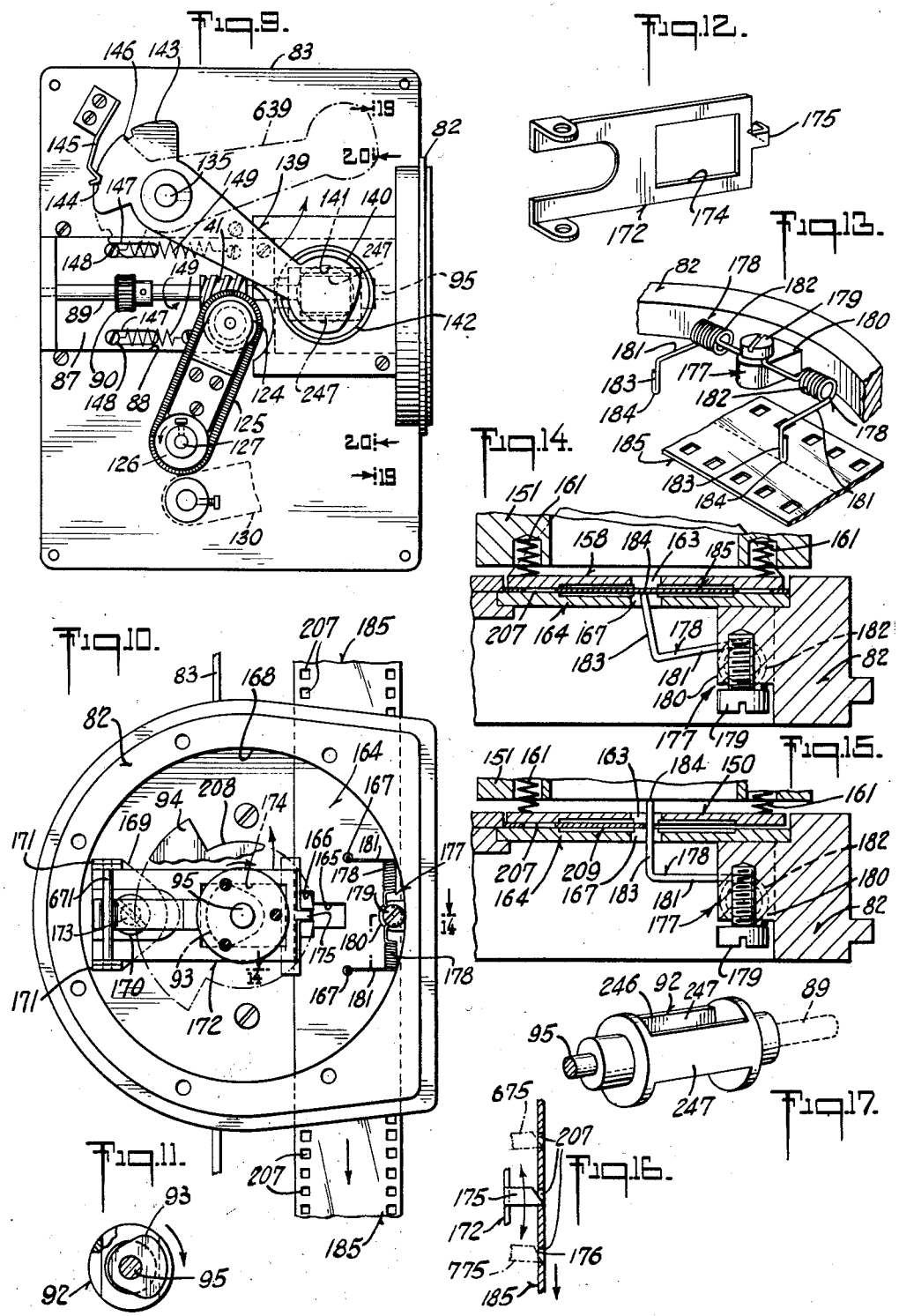

Nov. 17, 1959  J. W. OXBERRY  2,912,898
FILM GATE FOR COMBINED CAMERA AND PROJECTOR
Filed Jan. 22, 1954  11 Sheets-Sheet 5
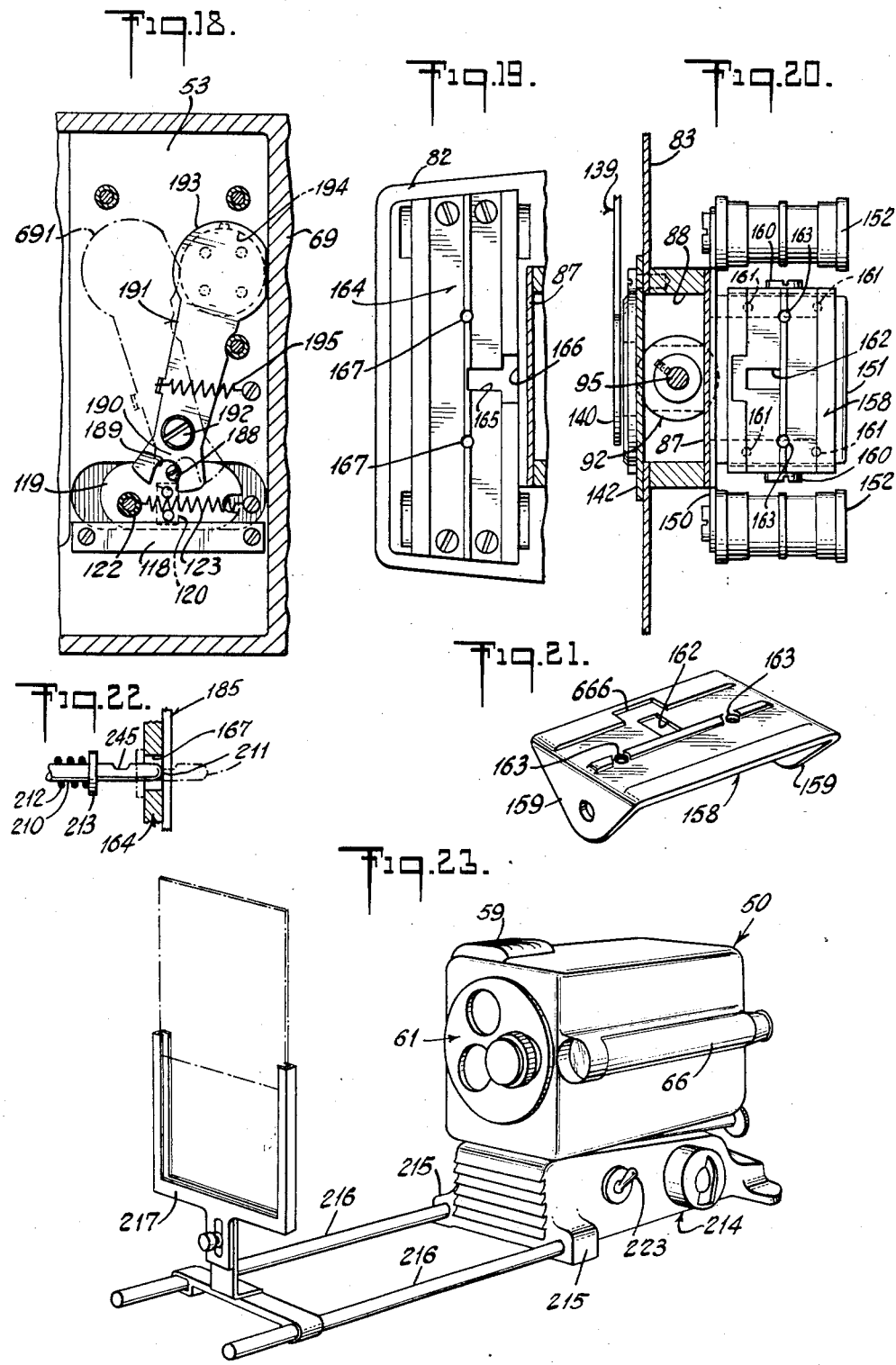

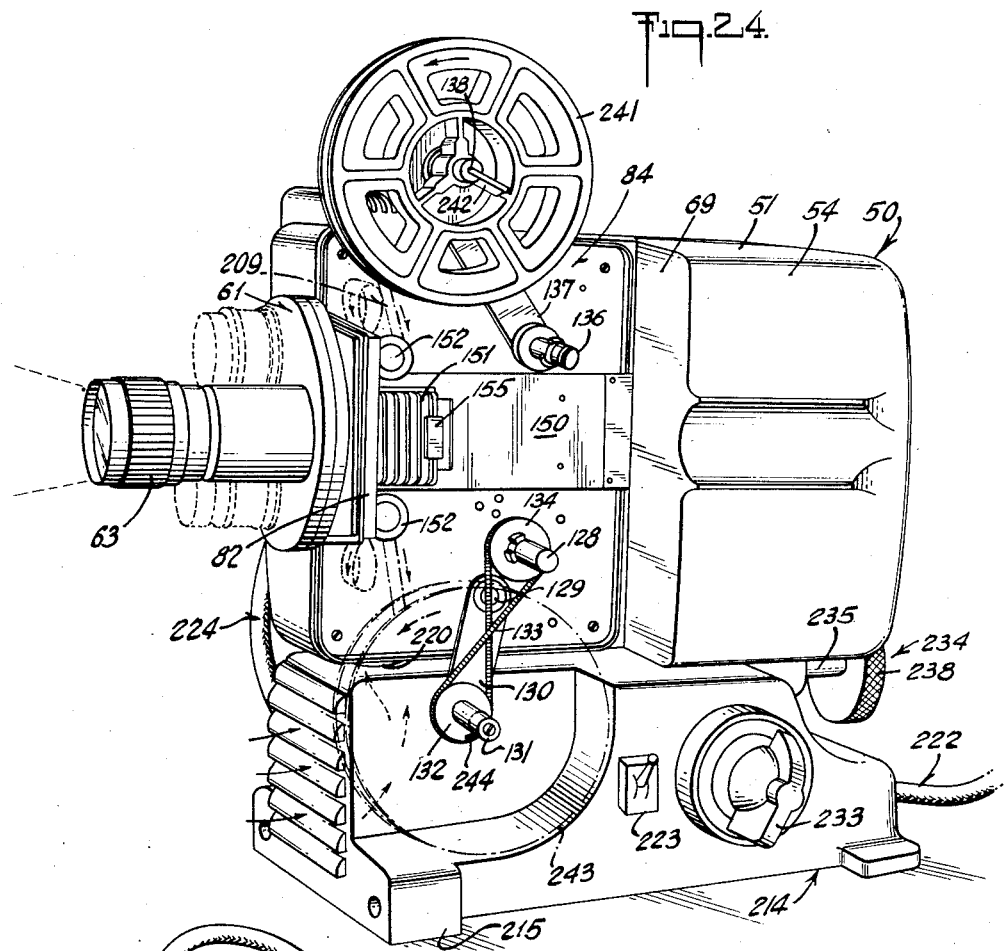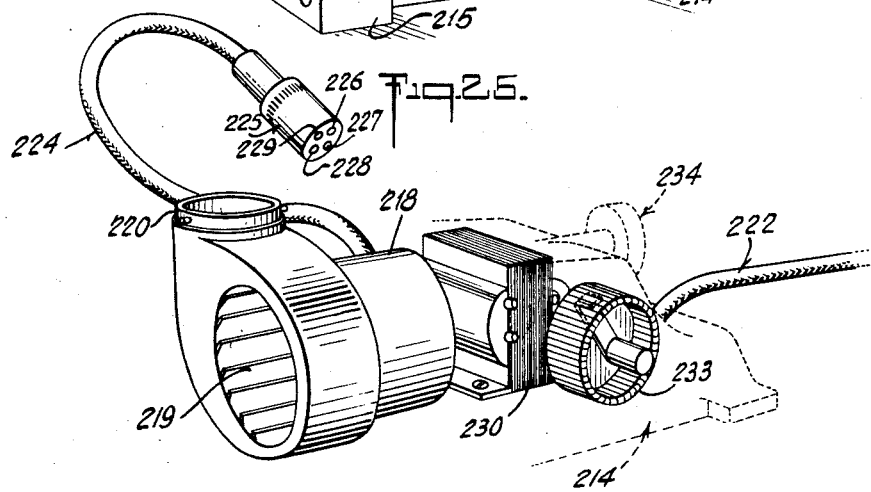

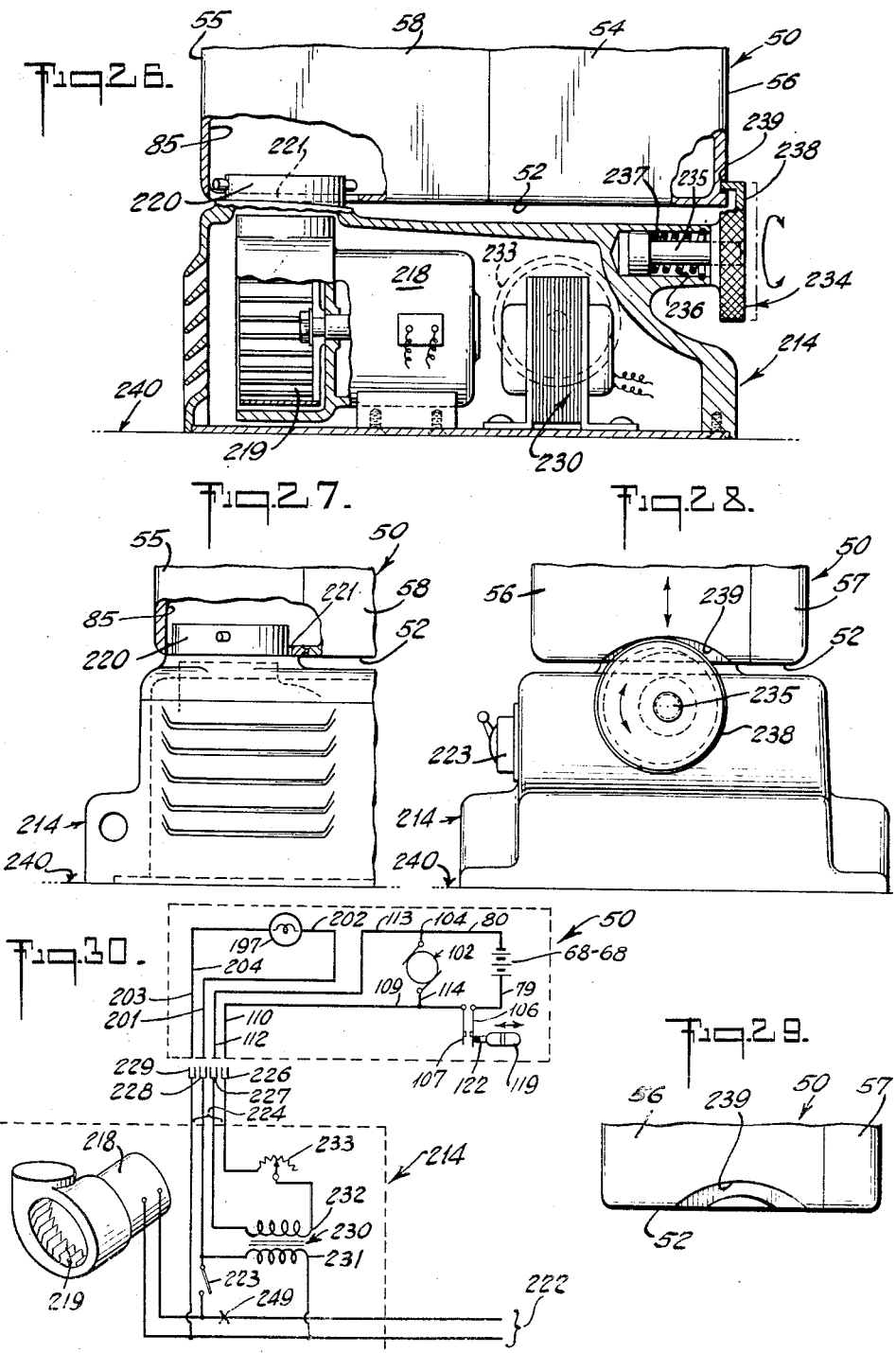

Nov. 17, 1959  J. W. OXBERRY  2,912,898
FILM GATE FOR COMBINED CAMERA AND PROJECTOR
Filed Jan. 22, 1954  11 Sheets-Sheet 9
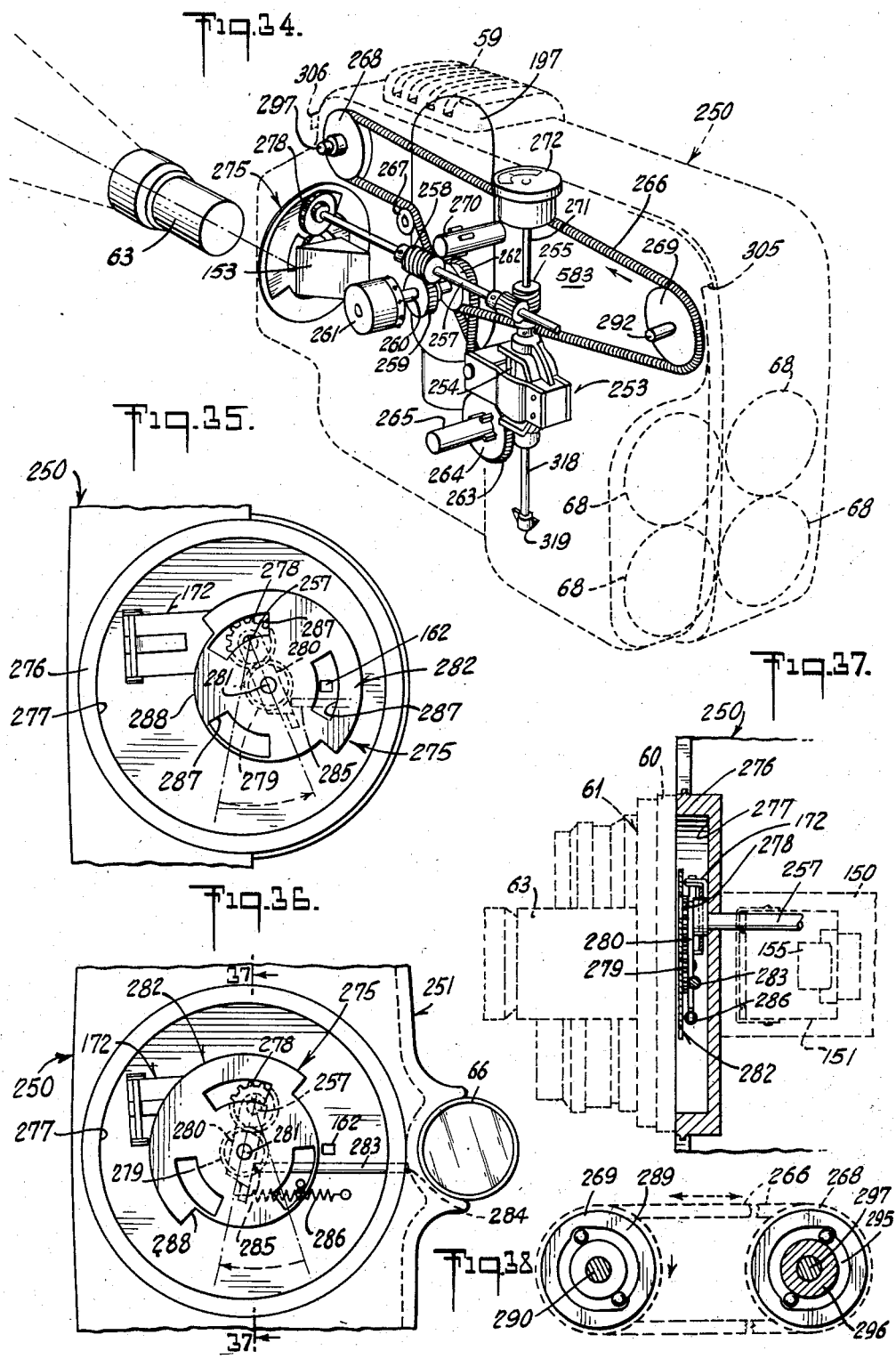

Nov. 17, 1959   J. W. OXBERRY   2,912,898
FILM GATE FOR COMBINED CAMERA AND PROJECTOR
Filed Jan. 22, 1954   11 Sheets-Sheet 10
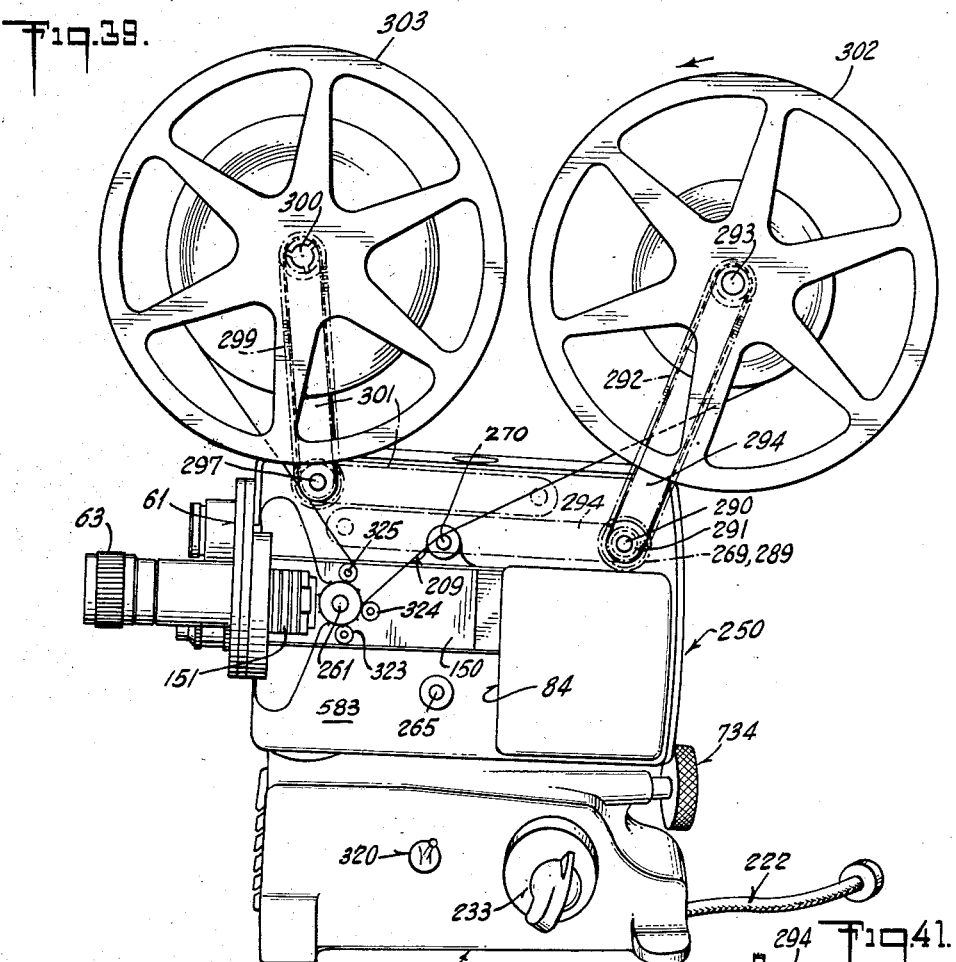
Fig.39.
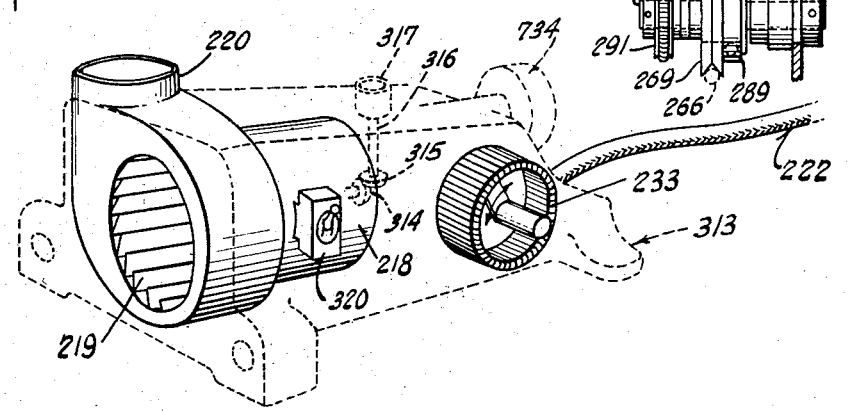
Fig.40.
Fig.41.

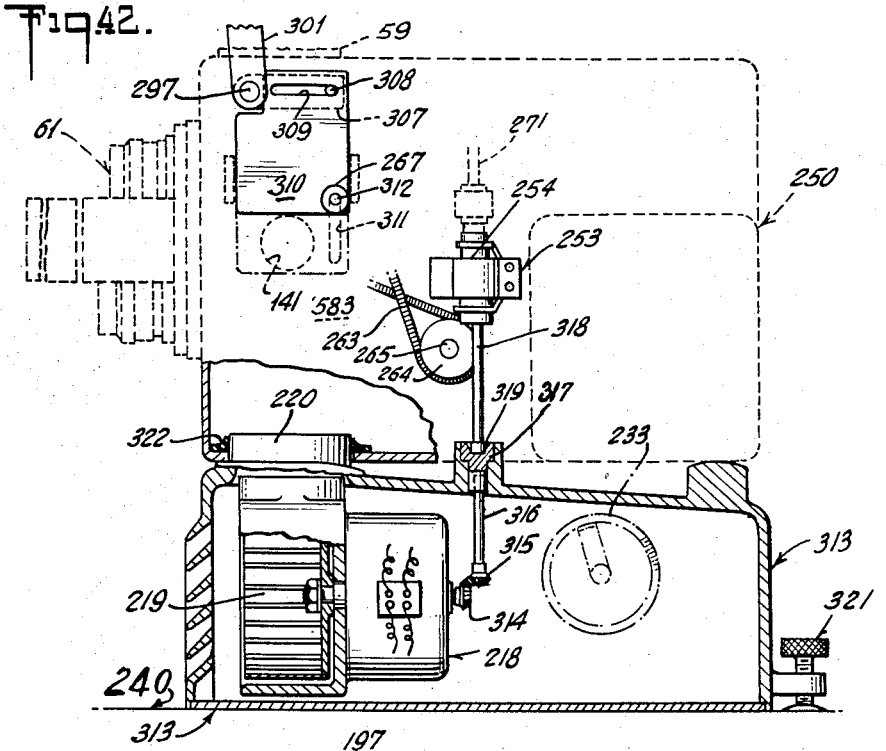
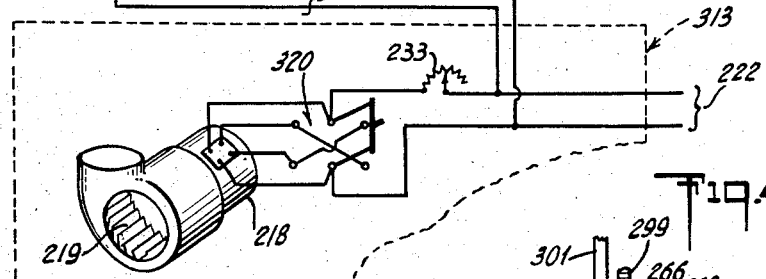
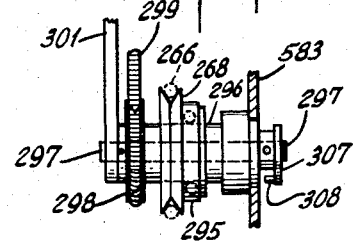

United States Patent Office 2,912,898
Patented Nov. 17, 1959

2,912,898

FILM GATE FOR COMBINED CAMERA AND PROJECTOR

John W. Oxberry, Riverside, Conn., assignor, by direct and mesne assignments, of one-half to A. Kip Livingston, West Hempstead, N.Y., and one-half to Longines-Wittnauer Watch Co., Inc., New York, N.Y., a corporation of New York Application January 22, 1954, Serial No. 405,543

13 Claims. (Cl. 88—17)

The present invention relates to apparatus which may be used both to take pictures and to project them and, more particularly, to an electrically-operated motion picture camera which may be converted by addition of accessories into an electrically-operated projector.

A general object of the present invention is to provide such a combined camera and projector apparatus which efficiently employs a common aperture or optical window and light path both for effectively taking pictures upon unexposed double-width film with one shutter means and projecting well-defined pictures with a minimum of flicker from a developed single width film with the use of other shutter means therein.

A more specific object of the present invention is to provide efficient embodiments of such apparatus characterized by a D.C. battery-operated camera unit for taking effectively half-width pictures successively upon the two marginal halves of unexposed double-width film with a camera shutter traversing a light path, and by a household A.C. electrical power-operated accessory unit readily attachable to the camera unit for projecting efficiently the half-width pictures from a developed single-width film along a path which includes the camera light path but by use of different shutter means.

Another object of the present invention is to provide such combined camera and projector apparatus which has common gate means for the double and single-width films with suitable means efficiently operable in different manners to serve as pressure reducing means during the taking of pictures on the unexposed or only partially exposed double-width film and to act as film guiding means in the projecting of pictures from the developed single width film.

A further object of the present invention is to provide in such combined apparatus means automatically operated by certain different manipulations characterizing camera and projector operations to condition certain incorporated mechanisms for effectively carrying out those two different operations.

An additional object of the invention is to provide embodiments of the invention which are readily constructed and assembled in an economical manner and which are efficiently operated in simple ways by those of little or no skill effectively to take and project good pictures of the "home movies" type.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

Fig. 4 is a side elevational view of the apparatus shown in Fig. 1 with the left side cover plate removed and with parts broken away and in section;

Fig. 5 is a longitudinal vertical section to enlarged scale of the apparatus shown in Figs. 1 to 4 inclusive taken substantially medially of the right and left sides thereof and substantially on line 5—5 of Fig. 6;

Fig. 6 is a longitudinal lateral section to enlarged scale of the apparatus shown in Figs. 1 to 5 inclusive taken substantially on line 6—6 of Fig. 4;

Fig. 7 is a transverse section to enlarged scale, taken substantially on line 7—7 of Fig. 4;

Fig. 8 is a section similar to Fig. 7, taken substantially on line 8—8 of Fig. 4;

Fig. 9 is an elevational detail of the central longitudinal partition of a mid-section of the apparatus of Figs. 1 to 8 inclusive as viewed from the right side and showing mechanisms supported thereon;

Fig. 10 is an enlarged elevational view of the front compartment of the apparatus of Figs. 1 to 9 inclusive as viewed with the front cover plate and with the turret lens structure removed therefrom, showing film advance mechanism and film biasing-guide means housed therein and illustrating use thereof with a double-width unexposed film;

Fig. 11 is a sectional detail with parts broken away of the cam means for operating the film advancing mechanism shown in Fig. 10; and showing the synchronized relation thereof to barrel or drum shutter means employed on projector operation;

Fig. 12 is a perspective view of the claw frame of the film advancing mechanism of Fig. 10 which is reciprocated by the cam means of Fig. 11;

Fig. 13 is an enlarged perspective detail, with parts broken away, of film biasing-guide means shown in Fig. 10 and illustrating the biasing function thereof with respect to a double-width film, a portion of which is illustrated;

Fig. 14 is a sectional detail, taken substantially on line 14—14 of Fig. 10, further illustrating the film biasing function of the film biasing-guide means;

Fig. 15 is a sectional detail similar to Fig. 14, illustrating the film guiding function of the film biasing-guide means shown in Figs. 10, 13 and 14;

Fig. 16 is a sectional detail illustrating operation of the advancing claw of the film advancing mechanism of Fig. 10;

Fig. 17 is a perspective detail of the drum or barrel shutter means used when the apparatus is conditioned for projection of pictures;

Fig. 18 is a sectional detail taken substantially on lines 18—18 of Figs. 6 and 8;

Fig. 19 is a sectional detail taken substantially on line 19—19 of Fig. 9;

Fig. 20 is a sectional detail taken substantially on line 20—20 of Fig. 9;

Fig. 21 is an enlarged perspective view of the film pressing or gate plate shown in Fig. 20;

Fig. 22 is a detail view, with parts in section and broken away, of a modified form of the film biasing-guide means shown in Figs. 10, 13, 14 and 15;

Fig. 23 is a perspective view illustrating mount of the camera apparatus of Figs. 1 to 22 inclusive on a suitable base unit equipped with means for film titling;

Fig. 24 is an elevational perspective of the camera-projector apparatus illustrated in Figs. 1 to 23 inclusive and the supporting base unit shown in Fig. 23 as employed together for projecting pictures;

Fig. 25 is a phantom perspective view of the base unit shown in Figs. 23 and 24, showing in full lines mechanism housed therein;

Fig. 26 is a side elevational view of the projector assembly shown in Fig. 24, with parts of the camera-projector apparatus broken away and in section, and with the shape and certain details of the casing thereof simplified for clarity, the base unit being shown in longitudinal vertical section;

Fig. 27 is a front elevational view, with parts broken away and in section, of the structure shown in Fig. 26;

Fig. 28 is a back elevational view of the structure shown in Figs. 26 and 27;

Fig. 29 is an elevational detail of that part of the camera-projector apparatus shown in Fig. 28;

Fig. 30 is a schematic diagram of the circuit of the projector assembly shown in Fig. 24;

Fig. 34 is a phantom perspective to enlarged scale of the embodiment of the apparatus shown in Fig. 33, showing in full lines certain of the mechanism housed in the casing and with parts broken away;

Fig. 35 is an enlarged front elevational detail of combined shutter mechanism in projector position of the Figs. 33 and 34 embodiment with certain of the casing means and the lens turret being indicated in dotted and dot-dash lines;

Fig. 36 is a detail view similar to Fig. 35, showing the shutter mechanism in camera position;

Fig. 37 is a sectional view taken substantially on line 37—37 of Fig. 36;

Fig. 38 is a sectional detail with parts broken away, of the belt-driven clutched pulleys or sheaves for operating the projector reels, those pulleys being shown in full lines in the upper part of Fig. 34;

Fig. 39 is a side elevational view to reduced scale of a projector assembly similar to that illustrated in Fig. 24, but with the employment therein of the camera-projector device of Figs. 33 to 38 inclusive mounted upon a modified base unit;

Fig. 40 is a phantom perspective to reduced scale, similar to Fig. 25, of the base unit shown in Fig. 39;

Fig. 41 is a detail to enlarged scale, with parts broken away and in section, of the drive pulley, reel supporting arm and reel rotating drive of the take-up reel of the projector shown at the right side of Fig. 39;

Fig. 42 is a side elevational view of the projector assembly of Fig. 39, with parts in section and others indicated in dotted lines, with a phantom view of certain internal mechanism of the camera-projector apparatus;

Fig. 43 is a detail view similar to Fig. 41 of the drive pulley or sheave, support arm for the projector supply reel and the drive for the latter, showing in association therewith means for operating the slide blind illustrated in Fig. 42; and Fig. 44 is a schematic diagram similar to Fig. 30 of the electrical circuit of the projector assembly shown in Fig. 39.

Figure 1:
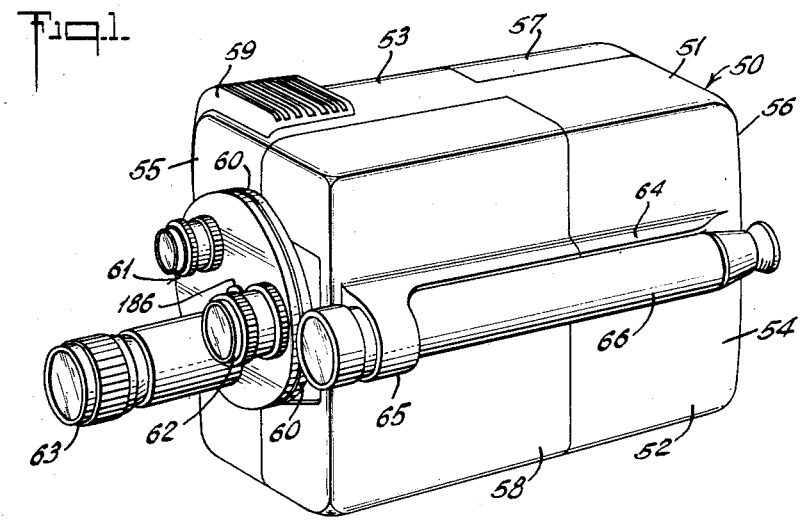
Fig. 1 is a perspective view of one embodiment of the motion picture camera-projector apparatus of the present invention as conditioned for camera operation.

Prior to the present invention, attempts have been made to incorporate in a single device mechanism which, with or without associated devices, could be employed both in the taking and projecting of pictures and, more particularly, motion pictures. Attempts have also been made to effect certain operations of such devices by electrical means. Also, some of such devices have attempted to employ common means in the optical systems designed for the alternate uses of camera and projector operation. However, most of such attempts have been unsuccessful from a practical point of view and prior inventors have failed to devise a marketable apparatus which could be efficiently employed for both operations, particularly with the use of double-width unexposed film for camera operation and for projector operation single width film resulting from splitting longitudinally the double-width film after being developed. These and other prior art problems have been effectively solved or practically eliminated by the combined camera-projector apparatus and associated mechanisms of the present invention and the embodiments thereof illustrated by way of example in the drawings.

Figure 2:
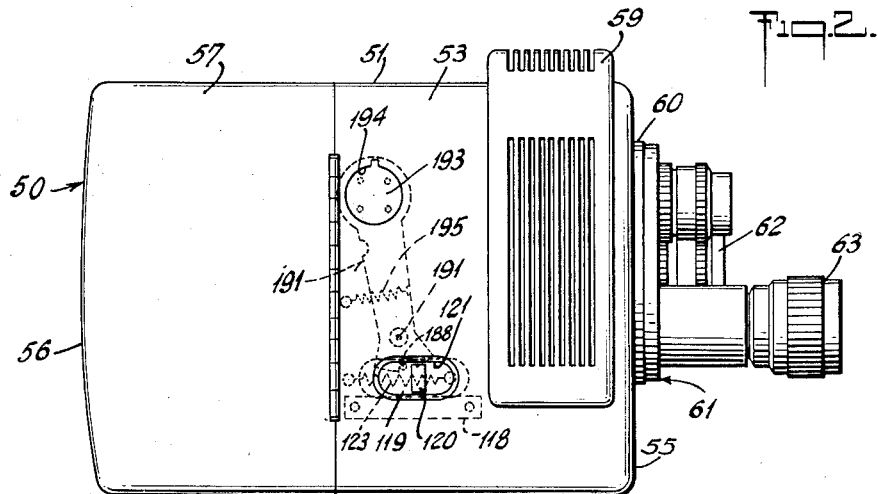
Fig. 2 is a side elevational view of the apparatus shown in Fig. 1 as viewed from the opposite side thereof.
Figure 3:
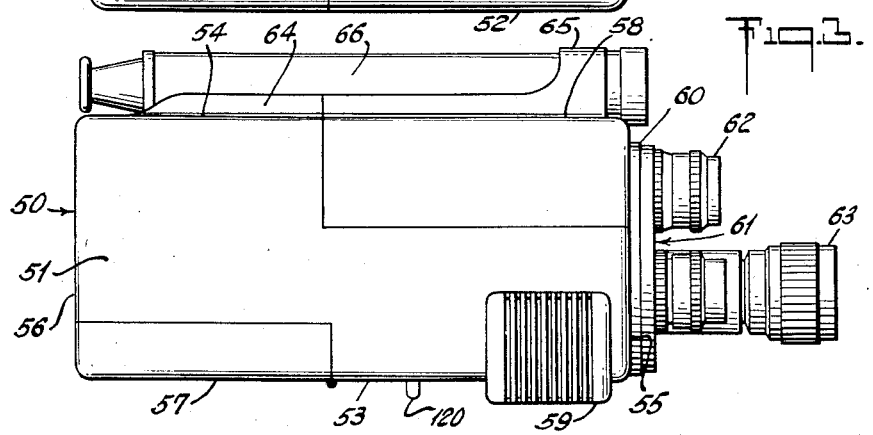
Fig. 3 is a top plan view of the apparatus shown in Fig. 2.

Referring to the drawings, in which like numerals identify similar parts throughout, and, more particularly, to sheets 1 to 8 inclusive and the figures appearing thereon, it will be seen that one embodiment of the present invention may be described as follows. As shown in Figs. 1, 2 and 3, an embodiment of the present invention may comprise a casing means 50 including top 51, bottom 52, right side 53, left side 54, front 55 and back 56 panel portions, which are permanently mounted together to provide with other elements suitable frame structure. The right side also includes a hinged door 57, which closes a battery compartment, and the left side includes a removable panel or cover plate 58, which closes a middle mechanism compartment. A removable, perforated or slotted cover 59 closes a light source or lamp compartment on the right side of the casing 50. The front panel portion 55 carries a circular front wall cover plate 60 on which is rotatably mounted a lens turret 61 carrying a plurality of lenses including a camera lens 62 and a projector lens 63 for selective alignment with a common optical window or aperture in the position of the camera lens 62 in Figs. 1, 2 and 3. Left side panel portion 54 and the compartment-closing panel 58 cooperatively carry a saddle 64 and loop or ring 65 adapted together slidably to receive and hold in the illustrated position a telescopic finder 66.

As illustrated in Figs. 4 to 21 inclusive, the encased embodiment, shown by way of example in Figs. 1 to 3 inclusive, has, as is more clearly shown in Figs. 4, 5 and 6, a rear compartment 67 designed to carry a plurality of batteries 68—68, such as size (D) dry cells, preferably six in number. Rear compartment 67 is defined by top panel portion 51, bottom panel portion 52, back panel 56, left side panel 54, right side door 57 and a fixed cross or transverse rear partition 69. The left side wall portion 54 is lined with a sheet 70 of insulating material which, as best seen from Figs. 4 and 6, carries on the inner face thereof electrically conductive straps 71 and 72 and terminal straps 73 and 74. The inner face of the door 57 is also lined with a sheet 75 of insulating material carrying electrically conductive straps 76, 77 and 78 which, together with the straps 71 and 72, connect the dry cells 68—68 in series between the terminal straps 73 and 74. Terminal wires 79 and 80 are extended through holes in the cross wall 69, as is best seen in Figs. 5 and 6, and are respectively connected to the terminal straps 73 and 74 in the battery compartment 67.

A middle or intermediate compartment 81 is defined by cross wall 69, portions of the top and bottom panels 51 and 52, right side panel 53, removable left side panel 58, and a front cross wall structure 82, the major portion of which is D-shaped, as best seen in Fig. 10, with the latter fitted into front panel portion 55 as shown in Fig. 6. The middle compartment 81 is sub-divided by a vertically-extending, longitudinal partition plate 83 into two chambers, 84 on the left side and 85 on the right side, as is best seen from Figs. 4, 6, 7 and 8. The partition plate 83 carries in the left side chamber 84 a pair of laterally-extending, longitudinal strips 86, 86, spaced one above the other, and which, together with a face plate 87 fixed thereto and portions of the partition plate 83, define a shaft chamber 88. A front portion of the right side chamber 85 serves as a light source compartment.

Within the shaft chamber 88 is rotatably supported, on a horizontal axis extending longitudinally of the casing 50, a main drive shaft assembly 89 which carries fixed thereto, in successive order from the rear end thereof, a worm gear 90, a worm 91, a drum or barrel shutter 92, a single lobe or heart cam 93, and a vane or plate shutter 94, with the front end of the shaft assembly extending through the front cross wall 82 for location of the cam and vane shutter forward of this front cross wall, as is best seen in Fig. 6. As will be best understood from Figs. 6 and 31, the main drive shaft 89 does not actually extend as a unitary element through the barrel or drum shutter 92 but the latter has one end thereof fixed to one end of the main section of the drive shaft 89 and the other end thereof fixed to a front stub section 95 which extends through front cross wall 82 and forward of the latter carries the heart cam 93 and the vane shutter 94.

The drive shaft 89 is driven by its worm gear 90 meshed with a worm 96, which is fixed upon a motor shaft 97 with those two elements extending from the right side chamber 85 through a hole in partition plate 83 into the shaft chamber 88, as will be understood from Figs. 6 and 8. The worm 91 on the shaft 89 is meshed with a worm gear 98 fixed on a short cross shaft 99 in shaft chamber 88 with one end of that short cross shaft being rotatably supported by shaft chamber plate 87 and the other end thereof rotatably supported in right side chamber 85 by a bracket 100, as is best seen in Fig. 8; and bracket 100 is supported on partition 83. The motor shaft 97 is carried by rotor 101 of an electric motor 102 in chamber 85 and with that motor provided with an A.C.-D.C. field winding 103, as is best seen in Fig. 8.

It will be understood from Fig. 5 that the terminal wire 80 of the D.C. electrical wiring within the casing 50 leads to one terminal 104 of the motor winding 103 and the other terminal wire 79 is connected to one terminal 105 of a circuit switch comprising a resilient contact arm or leaf 106 and another resilient contact arm or leaf 107 of electrically conductive metal. The switch leaf 107 is connected at 108 to a wire 109 which, in turn, leads to one terminal 110 of a four-terminal circuit connector 111. A second terminal 112 of connector 111 is connected by a wire 113 to the motor terminal 104, and switch leaf terminal 108 is connected by a wire 114 to the other motor terminal 115. Thus, dry cells 68—68 are connected in series with the switch comprising contact leaves 106 and 107 and the motor winding 103, and the circuit connector terminals 110 and 112 are connected in parallel with the switch and dry cells to the two motor winding terminals for alternate supply to the latter of suitable A.C. power, such as that of a household electrical supply circuit for A.C. operation when the battery D.C. circuit is broken at the switch. The D.C. operation of the motor 102 is intended for camera operation of the apparatus and the A.C. operation of the motor is intended for projector operation thereof. These circuit connections will be best understood from Figs. 5 and 30.

The circuit connector 111 and the switch leaves 106 and 107 are supported on a plate 116 of insulating material, such as Bakelite, in turn supported by posts 117 mounted on the inner face of right side wall panel portion 53, as will be best seen from Figs. 5 and 8. The inner face of right side wall panel portion 53 carries a bracket strip 118 which, as will be seen from Figs. 5 and 8, has an upper edge spaced inward of the inner face of the side wall slidably to receive therebetween a switch operating or control slide or plate 119 adapted for reciprocation back and forth along the inner face of this side wall. The switch control plate 119 carries a centrally-engageable projection or thumb button 120 which extends through an elongated, horizontally-extending slot 121 in the right side wall panel portion 53, as will be best understood from Figs. 2 and 8. The switch control plate 119 carries on the inner face thereof an insulated finger or post 122, the path of which is intercepted by switch leaf 106 so that when the slide 119 is pushed forward, the switch leaves 106 and 107 will be brought to contact of each other to close the D.C. battery circuit. The switch control slide plate 119 is spring-biased by relatively weak helical spring 123, having one end connected to switch operating post 122 and the other end fixed to the right side wall panel portion 53, as will be best understood from Fig. 18. The biasing of the switch control slide 119 is backward away from the switch leaf 106 and thus to a circuit-open position herein termed the "projector" position as will be understood from the description relative to projection operation set forth hereinafter. The opposite end of the path of travel of the switch control slide 119 is forward and considered the "camera" or switch-closing position thereof, and the slide has an intermediate "neutral" position.

As will be noted from Figs. 6 and 8, the worm 91 on drive shaft 89 is meshed with gear 98 on the short cross shaft 99 to drive pulley 124 fixed on that cross shaft and about which is lapped belt 125, in turn lapped about pulley 126 fixed on shaft 127 which is rotatably supported through partition 83. Shaft 127 fixedly carries in left side chamber 84 a take-up reel spindle 128 for camera operation, as will be seen from Figs. 4, 6 and 8. Partition 83 pivotally supports at 129 in left hand chamber 84 a pivoted arm 130 which rotatably carries, on its free outer end, spindle 131 to support the projector take-up reel. As seen in Fig. 4, a pulley 132, fixed to projector take-up reel spindle 131, has lapped thereabout a crossed belt 133, in turn lapped about a pulley 134 fixed on shaft 127 with camera take-up reel spindle 128, the functioning of which will be explained later. The partition 83 also rotatably supports another shaft 135 above shaft 127 and, as will be understood from Figs. 4 and 8, shaft 135 rotatably carries in left hand chamber 84 spindle 136 adapted to support the camera supply reel. The shaft 135 carries fixed thereto in left hand chamber 84 an arm 137 which, as will be seen from Figs. 4 and 7, carries on its outer end a fixed stub shaft 138 which is to support for free rotation thereon the projector supply reel.

The shaft 135 carries in right hand chamber 85 an arm 139 also fixed thereto, so that it will be rotated when the projector supply reel supporting arm 137 is swung up and down. As is more clearly illustrated in Fig. 9, arm 139 is in the form of blind-operating means or vane, having on one end thereof a target-like blind 140 to cover an optical aperture 141 in a fixture 142 fixed about a hole in partition 83 (Fig. 6) to form a light path between light source compartment portion of chamber 85 and the drum or barrel 92. Blind arm 139 preferably carries beyond its supporting shaft 135 a latch segment 143 having one notch 144 in which a spring detent 145 is to engage temporarily to hold the blind 140 in the full line closed position shown in Fig. 9. The latch segment also has another notch 146 in which detent 145 is to engage when the blind arm is swung up to the dot-dash position 639 (as illustrated by dot-dash lines in Fig. 9) by upward swing of the projector supply reel-supporting arm 137. Thus, when the apparatus is to be used as a camera, fogging of the film in the left hand chamber 84 is prevented by closing off passage of light through the slotted light source cover 59 by the blind 140 merely with retraction or downward swing of the projector supply reel-supporting arm 137 into the left hand chamber for housing therein to permit closure by the side panel cover 58.

As will be understood from Figs. 4 and 9, the fixed side wall plate 87 of shaft chamber 88 has a pair of slots 147, 147 in which headed pins 148, 148 are slidably received and each of which, in turn, has anchored thereto one end of a helical tension spring 149, with the other end of each tension spring suitably fixed to the plate 87 so as to urge these pins to forward positions. The pins 148, 148 are carried on the rear face of a sliding plate 150, as best understood from Figs. 6 and 8, to slide forward and back in chamber 84 along the front face of fixed plate 87 as guided by the pins in the slots 147, 147. Sliding plate 150 carries in left side chamber 84 a housing 151, fixed thereto, and a pair of vertically-spaced, round fixed film guide posts 152, 152 as is best seen in Fig. 4. The housing 151 is slidably disposed about an oblique mirror support 153 mounted on fixed plate 87, and this support is notched at 154 to provide a stop for a spring-biased latch 155 on the housing 151, as will be seen from Fig. 6. The mirror support 153 is faced with a mirror 156 obliquely disposed opposite barrel or drum shutter 92; and the mirror support carries a lens 157 through which reflected rays are to be projected forward, as will be more fully understood in connection with the description of the apparatus as conditioned for projection operation hereinafter set forth.

The mirror and lens housing 151 pivotally carries on the front thereof a U-shaped plate 158, as best seen in Figs. 20 and 21, which constitutes the film pressing or gate plate. Gate plate 158 has a pair of right-angled apertured ears 159, 159 which are pivotally mounted by screws 160, 160 to the top and bottom sides of the housing 151 for limited swing about a vertical axis. The gate plate 158 is biased at its four corners by helical compression springs 161—161 which are inserted between the back side thereof and the front of the housing 151, as indicated in Figs. 14, 15 and 20. A gate aperture or optical window 162 is provided in gate plate 158 to constitute the projection aperture. A pair of relatively small holes 163, 163 are provided in the face of gate plate 158 longitudinally-spaced along the film track and located intermediate the edges thereof, so that they will be disposed substantially at the longitudinal center line of a double-width film when moved along that track between the fixed guide posts 152, 152, about which the film is to be lapped.

The gate plate 158 is thus floatably carried by the retractable housing 151; it is opposed by fixed track means in the form of a fixed aperture plate 164 constituting a portion of the fixed front cross wall 82, such as by being mounted across a hole therein, as will be understood from Figs. 6, 10, 14, 15 and 19. As it best seen in Figs. 10 and 19, the fixed wall track plate 164 is provided with a T-shaped hole, the leg 165 of which constitutes the camera aperture and which is aligned with projector aperture 162, being slightly larger in width and length than the latter in accordance with good camera and projection practice. The light path forward from the film track or path through the aperture leg 165 is common to both camera and projector operation, as will be understood from the operation hereinafter described. The bar 166 of the T-shaped hole in the fixed plate 164 constitutes clearance for film advancing mechanism, such as a pull-down claw (as best seen in Fig. 10), as does a recess 666 in a raised side land or runner rail on the face of gate plate 158 (as best seen in Fig. 21). The fixed plate 164 has, as will be best seen from Fig. 19 a pair of longitudinally-spaced small holes 167, 167, which are aligned with the holes 163, 163 in the floating gate plate 158 (see Figs. 14 and 15) for a purpose hereinafter explained.

The front cross wall structure is formed by the D-shaped plate 82 and the front panel portion 55 into a side notch in which it is securely seated. The D-shaped structure 82 is cupped or provided with a cylindrical recess 168 which, together with cover plate 60, provides a chamber in which is housed the vane shutter 94 and the film advancing mechanism including cam 93 which is rotatably carried by section 95 of the main drive shaft 89. As illustrated in Figs. 6 and 10, a forked bracket 169 is pivotally mounted by a screw 170 to the inner face of the chamber or bottom of the recess 168. The pivoted bracket 169 has a pair of ears 171, 171 between which a claw frame 172 is pivotally supported by pin 671. The shape of claw frame 172 is best seen in Fig. 12. Claw frame 172 is biased inward by a leaf spring 173 beneath pivot pin 671 and has a rectangular hole 174 therein to provide a cam follower frame in which the single lobe cam 93 rotates for up and down swing of the former. Claw frame 172 carries on its outer end an inwardly-projecting pull down claw 175, as will be best understood from Figs. 12 and 16. It will be noted from Fig. 16 that the end edge of the claw is cut back at the heel 176 so as to provide an oblique camming surface to cam the claw out of the marginal perforations of the film, as will be hereinafter more fully explained.

The chamber 168 also houses film biasing-guide mechanism, as illustrated at 177 in Fig. 10 and in Figs. 13, 14 and 15. Such mechanism 177 may comprise a pair of arms 178, 178 which may be formed as integral sections of a piece of wire of spring steel or the like, medially anchored, such as by a screw 179 which clamps a medial loop to an ear or projection 180 fixed to the inner wall of the recess 168, as is best seen in Figs. 13, 14 and 15. Each arm 178 consists of a main portion 181, including one or more helical spring turns to form a spring section 182 from which the remainder extends tangentially, as shown, and a tip portion 183 which extends at a sharp angle to the main portion and preferably normal thereto. The end of the tip portion 183 preferably is bent back upon itself to provide a rounded nose 184 having substantial point contact with any flat surface, such as the face of a section of film 185, as illustrated in Fig. 13. As a result, the main and tip portions 181 and 183 are swingably supported about the axis of the coil section 182 to swing the film-contacting nose 184 through an arc. The nose 184 of each arm 178 is disposed in one of the holes 167 in the fixed film track plate 164 so as to bias the relatively wide or double width film 185 in opposition to the biasing thereof by the pressure plate 158, both by means of the springs 161—161 and 149, 149, as indicated in Fig. 14. This function and an additional function of serving as a guide for a side edge of narrower or single width film will be more fully explained hereinafter and in connection with the operations illustrated in Figs. 13, 14 and 15.

The circular front plate 60, which serves as a cover for the front cross chamber or recess 168, rotatably carries the turret plate 61 by means of a pivot screw 186, and a detent 187, preferably in the form of a spring-biased ball, as seen in Fig. 6, temporarily locks the turret plate 61 in any one of a plurality of positions selectively to hold the camera and projector lenses 62 and 63, or other lens mounted thereon, aligned with the fixed wall plate optical path aperture 165.

Referring again to Fig. 18, it will be seen that the switch control slide 119 carries on the inner side thereof a pin 188, which is disposed in a relatively wide notch 189 in the bifurcated end 190 of a blind arm 191 of the second class, pivotally mounted by a screw at 192 to the inner face of the right side wall panel portion 53. The other end 193 of the arm 191 is in the form of a target-like blind to be swung forward to the full line position shown in Figs. 2 and 18 to close off a hole 194 in the side wall panel portion 53 by the action of biasing spring 195 thereon when the control slide 119 is either in the middle "neutral" position, as shown in Figs. 2 and 18, or in the forward "camera" position.

For this purpose, the spring 195 has one end thereof connected to the arm 191 and the other end thereof connected to the panel wall 53, as seen in Figs. 2 and 18. Notch 189 is sufficiently wide as to permit the blind 193 to be biased to hole-closing position when the slide is either in the "neutral" position or "camera" position. When the switch control slide 119 is slid rearward toward rear cross wall 69, as viewed in Fig. 18 to the "projector" position, pin 183 thereon causes the blind arm 191 to swing back to the dot-dash position shown at 691 (Fig. 18) to cause blind 193 to uncover the hole 194 for reception therethrough of a suitable circuit connector for connecting internal wiring to external sources of power.

As will be seen from Figs. 5, 6 and 7, the light source compartment (the front portion of right side chamber 85) suitably houses an electric light socket 196 which removably receives an electric lamp or light bulb 197. Light bulb 197 is partially surrounded by a tubular shield 198 having a hole 199 in the side thereof facing the drum or barrel shutter 92 and between which is interposed a suitable condenser lens 200. As best seen in Fig. 5, third terminal 201 of the circuit connector 111 (mounted inside the apparatus behind the access hole 194) is connected by a wire 202 to one terminal of the lamp socket 196. Fourth terminal 203 of the connector 111 is connected by a wire 204 to the other terminal of the light socket. Thus, connector terminals 201, and 203 when connected to an external source of electric power, such as a household A.C. electrical supply circuit, will light the lamp 197 to serve as a light source for projection operation.

In operation of the apparatus illustrated in Figs. 1 to 21 inclusive as a camera for taking motion pictures, the operator may, if desired, remove the lamp 197 from compartment 85, but this is not necessary since it may remain housed therein during camera operation. The removable panel 58 on the left side of the casing 50 will be removed for loading the camera. After removal of panel 58 the loading will be effected by the following procedure including, first, retraction of the slide plate 150 in left side chamber 84 to its rear position, as indicated in full lines in Fig. 6, to engage the latch 155 on the mirror housing 151 with the notch 154 on the oblique mirror support 153. This separates the floating gate plate 158 from the fixed aperture plate 164 so as to permit ready reception therebetween of a strip of non-exposed double-width film 185. The strip of double-width film 185, which may be 16 mm. in width, is spooled up on supply reel 205, indicated in dotted lines in Figs. 4 and 8, and the latter will be mounted on non-driven supply reel spindle 136. The leading end of the strip of double-width film 185 will then be trained over the top guide post 152 and down between the fixed wall plate 164 and the retracted gate plate 158 to beneath the bottom guide post 152, and thence up over a take-up reel 206, shown in dotted lines in Figs. 4, 6 and 8 as being mounted on driven spindle 128 for rotation thereby. The latch 155 will then be pivoted by finger pressure to swing its front end outwardly out of notch 154 to permit the housing 151 and slide plate 150 to move forward so that the floating gate plate 158 snugs the double-width film 185 up against the rear face of fixed aperture plate 164, and with those two plates defining therebetween a film path. The removable side panel 58 is then replaced to close the camera casing. The switch control button 120 will be in the "neutral" or middle position, as illustrated in Figs. 2, 6 and 9, with the shutter blind 193 closing off the access hole 194. The turret plate 61 will be rotated to bring the camera lens 62 to alignment with the camera aperture 165 in the fixed aperture plate 164, and the apparatus is thus readied for camera operation, assuming that the dry cells 68—68 have been suitably loaded in the battery compartment 67.

When one wishes to take pictures with the loaded camera apparatus, the telescopic finder 66 serves its usual function and the operator pushes forward on the switch control button 120 to slide the control plate 119 forward from the "neutral" or middle position illustrated in Figs. 5, 6 and 18 to the "camera" position, causing the insulated pin 122 to push the switch leaf 106 to circuit closing contact of switch leaf 107. Thus, the battery circuit leading to the D.C.-A.C. motor winding 103 is closed, as will be understood from the wiring diagram of Fig. 30. As a result, the motor rotor 101 will be rotated by battery power to rotate the driving worm 96.

Since driving worm 96 is meshed with worm gear 90, fixed on main shaft 89, the latter will be rotated counterclockwise, as viewed from the rear. Shaft 89 rotates worm 91 to rotate worm gear 98 to drive pulley 124 with the latter driving pulley 126 by belt 125 so as to drive the lower transverse shaft 127 to rotate take-up reel spindle 128 clockwise, as viewed in Fig. 4. This will apply tension on the double-width unexposed film 185 to spool it up as it is delivered down the film track along the film path between the fixed aperture plate 164 and the biased gate plate 158 by means of the feeding mechanism or pull-down claw device.

During each complete rotation of shaft 89 through 360°, the claw 175 is biased by leaf spring 173 at an upper position to engagement in any one of the side film perforations 207—207, as illustrated in dot-dash lines at 675 in the upper portion of Fig. 16. The cam 93 is rotated in follower frame hole 174 to cause claw 175 to pull the double-width film 185 downward a distance equal to one-half the length of a picture frame or to the full line position shown in Fig. 16, and thereafter without pause to continue downward with the claw moving to the dot-dash position 775 shown in the lower portion of Fig. 16 for advance of the film one frame. The vane shutter 94 is so timed with respect to the cam 93 such that a cutout or cut-back portion 208, extending over about 230° of the shutter vane, will uncover the camera aperture 165 during the time the double-width film 185 is held stationary therebehind (with the claw 175 disengaged and returning upward) for efficient exposure of a picture on one longitudinal half of the double-width film (that on the right side as viewed from the rear). The portion 94 of the shutter vane closes off the camera aperture 165 for about 130° of one rotation of the drive shaft 89, while the cam 93 is pulling the double-width film downward, as viewed in Fig. 16, from the top dot-dash position 675 through the full line position and down to the bottom dot-dash position 775 of the claw 175 therein shown. The relative positions of the pull-down mechanism as viewed in Fig. 10 are those which obtain during the upward return of the disengaged claw from the lower dot-dash position 775 up to the top dot-dash position 675 at an intermediate point of the return path and while the film frame is being exposed. Thus, Fig. 10, shows in full lines the relative positions of parts during the claw return movement when disengaged from successive film perforations 207, 207, while Fig. 16 shows in full lines, the engaged position of the claw at a point about one-half of the film pull-down operation thereof. By virtue of the oblique shape of the nose of the claw 175 with cutback of its heel 176 and the fact that the claw is deeper than the length of each perforation 207 so that only the claw nose extends into the perforation as shown in Fig. 16, the lightly biased claw will be cammed out of each perforation to be lightly dragged along the film face up from the lower advance position 775 during its lifted return movement to the top engaging position 675.

During such operation of the camera with the step-by-step advance of the double-width film 185 along the film path between the tracks of the biasing gate plate 158 along the fixed aperture plate 164, the noses 184, 184 of the biasing-guide elements 183, 183 extend through the holes 167, 167 in the fixed aperture plate to apply drag to the double-width film approximately at the longitudinal center line thereof, as will be best understood from Figs. 13 and 14. This force is applied to the center line of the double-width film in opposition to the biasing thereof by the gate plate 158 so as to reduce the drag of the emulsion face of the film against the track of the fixed aperture plate 164, thereby minimizing tendency to scratch the emulsion face in the pair of frame zones flanking the film center line to opposite sides thereof. The film emulsion face is the lower face of the film as viewed in Fig. 14. The slick rear side of film 185 has little drag against the track of gate plate 158. This film-biasing function of the film-biasing fingers 183, 183 is important only to camera operation where double-width film, such as 16 mm. in width, is to be employed in taking pictures, first by exposure of one marginal half of the film and then upon reversal of the supply and take-up reels in the camera, exposure of pictures on the remaining marginal half of the film, as is common pratcice. The other guiding function of the biasing fingers 183, 183 will be described later in connection with projector operation after the exposed double-width film has been processed, split longitudinally, and spliced to form a developed, single-width film 209, indicated in Fig. 15, and which may be about 8 mm. in width.

The film biasing-guide elements or fingers 183, 183 may be provided in forms other than those illustrated in Figs. 10, 13, 14 and 15. As proposed in Fig. 22, such means may be in the form of a cylindrical pin 210 having a rounded nose 211 to apply drag along the center line of the double-width film 185 when biased to the full line position proposed in Fig. 22 by suitable biasing means. Such biasing means may be a helical compression spring 212 having one end suitably abutted against a fixed structure in the front cross chamber 168, as a cover plate 60 thereof, and the other end of this spring may be abutted against a circular flange or collar 213 on the pin 210. It is obvious that any simple and conventional form of mount for a spring-biased sliding pin or projecting detent may be employed reciprocatively to support pin 210 on the fixed camera frame, such as on the front cross wall structure 82. For example, in order to substitute the film biasing-guide means of Fig. 22 for the arms 178, 178 and their fingers 183, 183 one may provide an ear or projection on the inner face of recess 168 in cross wall structure 82, similar to that shown at 180 in Figs. 13 to 15 incl., but enough longer to reach in radially beyond one of the holes 167 in fixed aperture plate 164. A hole extending through such ear aligned coaxially with this hole 167 could simply reciprocatively receive in a guiding manner the shank of pin 210 and its biasing spring 212, with the back end of the latter abutted against cover plate 60.

The camera-projector apparatus of the Figs. 1 to 21 inclusive embodiment is intended to be supplied along with a suitable supporting base unit 214, as seen in Fig. 23, and with the latter equipped, if desired, with side projections or front feet 215, 215 removably to support forwardly-extending rods 216, 216 on which may be mounted a tilting frame 217.

When it is intended to employ the camera-projector apparatus of Figs. 1 to 21 inclusive as a projector, as illustrated in Fig. 24, the base unit 214 not only serves as a support for the encased unit 50 but also as part of the operating mechanism. For this purpose, as will be understood from Figs. 24 to 30 inclusive, the base unit 214 includes a 110 v. A.C. motor 218, which operates a fan or blower 219 provided with an upwardly-extending outlet duct or tube 220 which is receivable in a hole 221 in the bottom of light source chamber 85, as is best understood from Figs. 7, 26 and 27, so as to direct cooling currents of air up about the lamp 197. Power is supplied to the motor 218 by means of a flexible supply cord 222, connectable to a 110 v. A.C. household electrical supply circuit and, as will be understood from Fig. 30, lamp circuit wiring is connected in parallel thereto through a switch 223 by means of a four-conductor cable 224, terminating in a female connector 225 adapted to be engaged through the hole 194 of the camera casing with the connector 111 and its male prongs, shown in Fig. 8, and comprising the terminals 110, 112, 201 and 203 of the wiring in the camera-projector apparatus 50. As viewed in Fig. 25, the female sockets 226, 227, 228 and 229 of connector 225 are respectively receivable of the prongs forming the terminals 110, 112, 201 and 203, so that the latter two will supply current to the lamp 197. The sockets 226 and 227 supply current to the wiring 109 and 114, and wire 113, leading to the D.C.-A.C. motor 102, so that the latter may be operated on A.C. power. The base unit 214 also includes a step-down transformer 230, the primary winding 231 of which is connected through switch 223 to the A.C. supply conductors 222. The secondary winding 232 of the transformer 230 is connected through a rheostat 233 to the female sockets 226 and 227 which supply A.C. current to the motor 102 for A.C. operation thereof during projector operation.

As will be understood from Figs. 24, 25, 26 and 27, the camera-projector encased unit 50 will be mounted upon the base unit 214 for projector operation by inserting the outlet tube 220 of the fan 219 in the hole 221 in the bottom of the lamp compartment 85 and preferably locking it thereto by any suitable means, such as by a bayonet connection. The encased camera-projector apparatus 50 will then be moved to substantial alignment with the base 214, as illustrated, and with an elevation-adjusting means 234 on the base unit engaging the camera-projector superstructure for adjustment of the elevation of the back end of the latter relative to the base unit. The elevation adjustment mechanism 243 may comprise a headed pin 235 seated in a socket 236 in the back end of the base unit 214 and retained therein by a helical biasing spring 237. The pin 235 carries, externally of the socket 236, an eccentric head 238 which, as will be best understood from Figs. 28 and 29, is rotatable in an arcuate recess 239 in the back bottom edge of the encased device 50. Thus, as the eccentric head 238 is rotated in one direction, it will gradually cam the back end of the camera-projector device upwardly and, with rotation in the opposite direction, gradually lower the device relative to the base unit 214 for adjustment of the angular relationship of the optical path relative to a substantially horizontal plane, in which the supporting surface 240 for the base unit (such as a table top) will normally be approximately disposed.

In operation of the projector assembly illustrated in Figs. 24 to 30 inclusive, the operator will remove the left side panel or cover 58 and swing the arm 137 upwardly about the axis of the camera supply reel spindle 136 to an extended position, such as that illustrated at the top of Fig. 24, any suitable means being employed temporarily to hold it in such position, such as frictional drag between the far face of the arm 137 against a top edge flange of the projector casing structure. A loaded projector supply reel 241 will be mounted for free rotation upon the fixed spindle stub 138 carried by the outer end of the arm 137, and temporarily held thereon by a pivoted latch 242. The developed strip of film which is spiralled on supply reel 241, illustrated in dot-dash lines at 209 in Fig. 24, may be of a single width, such as that obtainable by splitting longitudinally the double-width film 185 after exposure of two longitudinal rows or series of picture frames on the two marginal halves thereof. As shown in Fig. 24, the single-width film 209 will be trained about the top guide roll 152, then down between the fixed aperture plate 164 and the spring-biased gate plate 158, thence about the lower guide roll 152, and finally to a lower take-up reel 243 indicated in broken lines of Fig. 24. The projector take-up reel 243 is mounted for drive upon the spindle 131 which carries an oblique fin or key means 244 in the form of a wire loop, as may be best seen in Fig. 7, so as to engage in a slot in the hub of the usual projector take-up reel. The take-up reel 243 assumes the lower position alongside the left side of the base unit 214, as illustrated in Fig. 24, with swing of the arm 130 downwardly to tense the crossed resilient spring belt 133 about the pulleys 132 and 134 with the latter being driven from the shaft 127 which drives the camera take-up reel spindle 128, with the latter serving no useful purpose in this projector operation. The pivoted arms 137 and 130, which respectively support the projector supply reel 241 and take-up reel 243, thus are readily pivoted to extended positions so that the apparatus will accommodate the larger projector reels commonly used while permitting swing back into the open left side chamber 84 to permit closing thereof for camera operation. The longitudinal partition 83 substantially subdivides compartment 81 and thus, with the drive pulley 134 and pivoted arm 137 positioned only a limited distance to the left therefrom for housing in the casing unit 50 with replacement of side cover panel 58, provision must be made for clearance between the left side of the base unit 214 and the arm 137 with the projector take-up reel 243 supported on the latter. Such is accomplished by the provision of an arcuate recess 248 shown only in Fig. 24 and there illustrated perhaps to a shallower extent than it may be in the actual construction merely to avoid confusion in the showing of the other associated parts.

As will be best understood from Fig. 15, the single-width developed film 209 which is to be used in projection operation is led between the left sides of the fixed aperture plate 164 and the spring-biased floating gate plate 158 so that the single row of claw perforations 207 along the left margin thereof, as viewed in Fig. 15, will be in engageable position relative to the claw 175 of the pull-down mechanism. Since the single-width film presents only one-half the surface area to the track of fixed aperture plate 164 as does the double-width film 185, as will be understood from a comparison of Fig. 15 with Fig. 14, the drag on the outer emulsion face of the single-width film, due to the biasing of the floating gate plate 158 is materially less and perhaps about one-half that on double-width film. It is thus not necessary to oppose that biasing or pressing of the single-width film with a force, such as the counter biasing of fingers 183, 183 against the outer film face. However, it is necessary to practical projector operation meticulously to guide the single-width film to the left half of the film path, as viewed in Fig. 15, and this is efficiently accomplished by the fingers 183, 183. In the absence of film at the center line or centrally of the aligned holes 163, and 167, the noses 184, 184 of fingers 183, 183 will be swung therethrough from the positions illustrated in Fig. 14 approximately to the positions illustrated in Fig. 15. This swing of each finger 183 substantially about the axis of the helical spring section 182 causes the nose 184 of each finger to swing to the right, as viewed in Fig. 15, so as to dispose the outward or left side of the finger substantially at the center line of the film path there to serve as an effective side guide for the adjacent edge of the single width film 209, precisely to confine it to the left half of the track. Thus, the spring-biased fingers 183, 183 serve with double-width unexposed camera film 185 as suitable drag means to apply counterbiasing force to this film backward in opposition to the forward biasing thereof by the biased floating gate plate 158 to reduce drag between the front face of the double-width film and the fixed aperture plate 164 in camera operation; and these fingers serve with single-width film 209 as side edge guide means in projector operation.

The modified form of the film biasing-guide means, illustrated by way of example in Fig. 22, similarly functions alternately with double-width and single-width film, applying drag along the center line of the double-width film with the parts in the full line position shown in Fig. 22, serving solely as guide means with single-width film when the pin 210 is permitted to project through the hole 167 to the dotted line position with a notch 245 in the side of the pin receiving the edge of the single-width film to permit it to travel along the center line of the track or film path. In such alternate operation of the mechanism illustrated in Fig. 22, the flange 213 forms the abutment for the inner end of the helical compression spring 212, and it also serves in projector operation as stop means for abutment against the front face of the fixed aperture plate 164, as indicated in dotted lines, to assure proper alignment of the notch 245 with the edge of the single-width film.

When the camera-projector apparatus 50 is so conditioned for projector operation with mount thereof on the base unit 214, the aperture 162 in the floating gate plate 158 serves as the optical window since the leg 165 of the aperture in the fixed plate 164 is slightly larger. As will be best understood from Fig. 31, the optical path of projector operation includes the lamp 197 as the light source, the condensor lens 200, the rotary drum or barrel shutter 92, the oblique mirror 156, lens 157, the gate window 162 (not there shown but disposed immediately behind the single-width film 209), and the projector lens 63 mounted upon the turret assembly 61.

Figure 31:
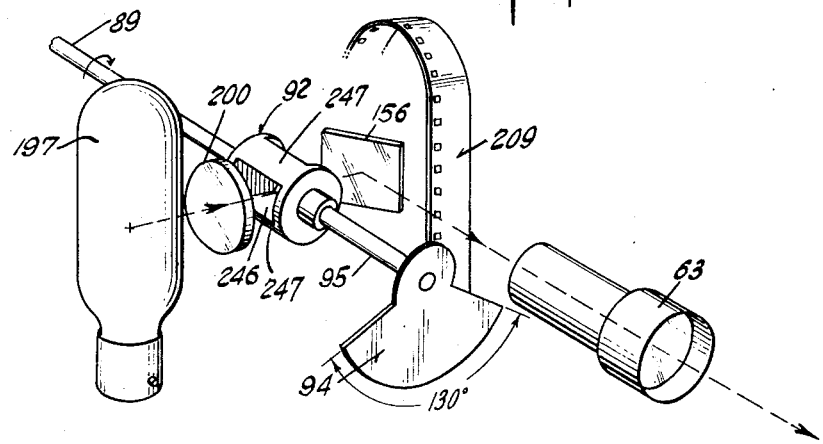
Fig. 31 is a perspective view of the optical system employed in projecting pictures by the assembly of Fig. 24.
Figure 32:
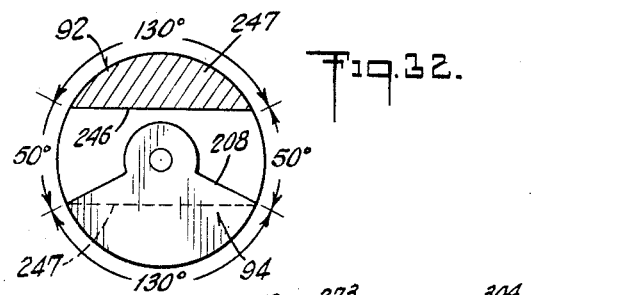
Fig. 32 is a diagrammatic showing of the combined drum or barrel and vane shutters as employed in the optical system of Fig. 31, indicating the synchronized relation thereof.

As will be best understood from Figs. 17, 31, and 32, the rotary drum or barrel shutter 92 is transversely slotted to provide a lateral through opening 246, through which the light rays are to pass from the condensor lens 200 to the oblique mirror 156. Diametrically opposed portions 247, 247 of the drum shutter structure 92 remain to form shutter means to intercept the optical path of light rays passing therealong twice during each single revolution of the drum shutter. Preferably the plate or vane shutter 94 has an optical path-intercepting portion extending through about 130° and, thus, the intercepting portions 247 of the drum shutter preferably also extend through similar 130° angles and the former is synchronized with one of the latter, as will be best understood from Fig. 32, so as not to interfere with a beam of light which is passed through the opening 246 in the drum shutter as it passes forward from the oblique mirror 156 along the common portion of the optical path for both camera and projector operations. Although the arcuate portion of shutter vane 94, which intercepts the common portion of the optical path, is diagrammatically illustrated in Fig. 32 as being of approximately the same diameter as the drum or barrel shutter 92, in the operating embodiment the diameter of the latter is considerably less but the relationship thereof is obviously the same, and the same relative diameters have been employed in Fig. 32 for clarity and understanding the synchronous relation thereof. Thus, on camera operation the vane or plate shutter 94 is alone employed for interception of that portion of the optical path which is common to both camera and projector operations, and the drum or barrel shutter 92 is employed on projector operation for interception of the projection optical path back of the film track with the vane shutter 94 in front of the film track so synchronized as to have no effect on the projector operation. It will thus be seen that in camera operation during each revolution of the main shaft 89 while the film is stationary behind the camera aperture 165, there is exposure of the film emulsion in one frame area during 230° of the shaft revolution; and during projector operation the rays of light are permitted to pass through the developed frame of the stationary single-width film twice during each revolution of the main drive shaft so as effectively to reduce flicker in the projected pictures.

It will be noted that when the camera-projector apparatus is conditioned for projector operation, as illustrated in Fig. 24, the upward swing of arm 137 to the shown extended position for reception and support of the projector supply reel 241 causes the blind arm 139 to pivot upwardly to the dot-dash position 639, as illustrated in Fig. 9, so that the blind 140 uncovers the hole 141 to permit light rays to pass from the light source lamp 197 through the partition 83 to the barrel or drum shutter 92 and thence to the oblique mirror 156. On camera operation, however, the blind 140 effectively closes hole 141 to prevent leakage of light into left side chamber 84 to avoid fogging of the film. Also, for projector operation the switch control slide 119 and its operating button 120 are initially located in the "neutral" position with the switch in the motor circuit wiring inside the camera-projector unit being open and with the shutter blind 193 closing the access hole 194 behind which the male circuit connector 111 is located. The shutter blind arm 191 is swung to the dot-dash posititon 691 indicated in Fig. 18, to uncover the circuit connector 111 by sliding back the switch control plate 119 with movement of the button or trigger 120 back to the "projector" position to permit plug-in of the circuit connector 225 on cable 224 leading from the base unit 214. Likewise, if the apparatus is conditioned for camera operation with the switch control slide 119 in the mid or "neutral" position, as illustrated in Fig. 18, the shutter blind 193 may be swung to the dot-dash position 691, there illustrated, by pulling the button 120 back to "projector" position, and this will permit plug-in of a similar female connector to be plugged in for a circuit-closing remote control cable.

When one conditions the camera-projector apparatus as a projector as illustrated in Fig. 24, plugging of the female connector 225 in through the hole 194 for circuit connection with the male connector 111 in the encased device 50 holds open the battery circuit. However, as will be understood from Fig. 30, this plug-in connects the motor terminals 110 and 112 through the rheostat 233 to the transformer secondary 232 for supply thereto of A.C. power from the transformer primary 231 when the switch 223 on the side of the base unit 214 is closed. Closure of the switch 223 also closes the circuit of the light source lamp 197 and the blower motor 218 is operated from the time the supply cable 222 is plugged into the household A.C. supply circuit. If desired, the switch 223 may be located at the point 249 in Fig. 30 so as to control not only the motor and lamp circuits of the apparatus 50 but also the circuit of the blower motor 218.

With the projector circuits of Fig. 30 energized, the blower 219 delivers air up through duct or tube 220 into the lamp chamber 85 past the energized lamp 197 for keeping the latter cool. The A.C. operation of motor 102 operates the mehcanism within the camera-projector apparatus so as to pull down step-by-step the single-width film 209 past the optical aperture 162 in the floating gate plate 158. Light rays pass laterally from the light source 197 through the condenser lens 200 and the barrel shutter 92 to be reflected by the oblique mirror 156 forward through the lens 157, the gate aperture, a picture frame, and finally through the projector lens 63, with the light beam being interrupted twice by the barrel shutter during each pause of a picture frame opposite the projector aperture. The motor 102, being of the D.C.-A.C. type, effectively operates on the A.C. current at the reduced voltage delivered by the step-down transformer 230.

As illustrated in Figs. 33 to 44 inclusive, another embodiment of the present invention may comprise an encased camera-projector unit 250 which employs many of the mechanisms of the encased unit 50 but differs in some respects therefrom in the shutter mechanism, the arrangement of the projector reels-supporting arms and drive thereof, as well as the drive of various of the other mechanisms. As best seen from the phantom view in Fig. 34 and the full line view in Fig. 33, the whole left side of the casing of the apparatus is in the form of a cover plate 251 and the battery chamber 252 is in the lower rear section of the device. As in the first embodiment, the battery motor 253 is located in the right side chamber but is of only the D.C. type to be operated only by the dry cells 68—68. The rotor 254 of the motor 253 drives a worm 255 meshed with a worm gear 256 fixed upon a horizontal main drive shaft 257, which is the equivalent of the main drive shaft 89 of the first embodiment. The main drive shaft 257 also carries a worm 258 meshed with a worm gear 259 fixed upon a cross shaft 260, which carries on one end a film-advancing sprocket 261 and on the other end a drive pulley 262 of the double-sheave type. The double-sheave pulley 262 has a crossed belt 263 lapped thereabout and about another pulley 264 which drives a camera take-up reel spindle 265. The double-sheave pulley 262 also has lapped against the bottom side thereof a run of another long belt 266, which is trained up over a tensioning idler 267 and lapped about two sheaves or pulleys 268 and 269 respectively at the front and rear near the top of casing. The camera supply spindle 270 is mounted for free rotation to the supporting structure, as in the first embodiment.

Figure 33:
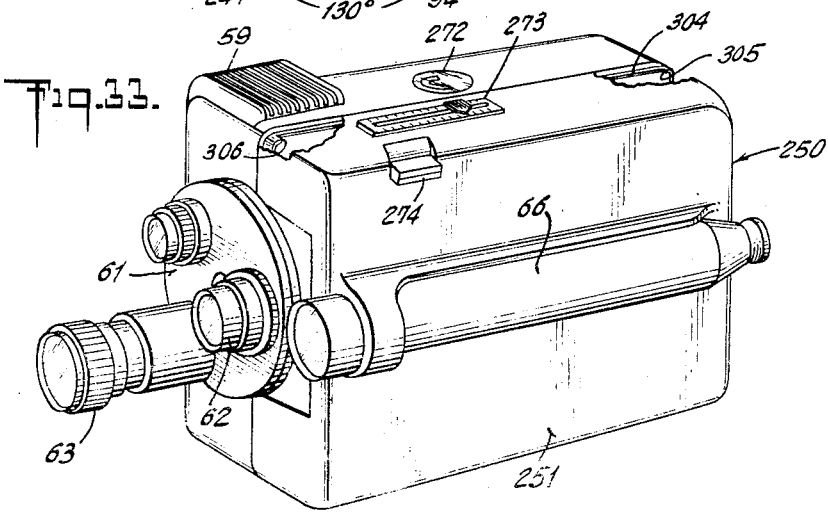
Fig. 33 is a perspective view similar to Fig. 1 of another embodiment of the apparatus of the present invention and with parts broken away.

The motor rotor 254 carries above the drive worm 255 a shaft extension 271 which operates a tachometer device 272, the dial face of which is set flush in the top of the casing 250, as will be best seen from Fig. 33. The top of the casing is also fitted with a time and footage telltale device 273 suitably operated by any suitable mechanism well-known in the art from the load of unexposed film on the camera supply reel which is to be supported on the rotatable spindle 270. The left side cover panel 251 is latched in position, the thumb operating means 274 thereof being shown in Fig. 33, and such secure latching of the cover panel 251 is essential since that panel, when mounted, is to hold a common shutter mechanism in a camera-operating position.

The camera-projector apparatus 250 of the second embodiment includes a lamp compartment, condenser lens structure, and oblique mirror, with the latter mounted on fixed bracket 153, all similar to those elements of the first embodiment. Also, the fixed aperture plate and the floating biased gate plate, which define therebetween a film path adapted alternately to handle double-width unexposed film and single-width developed film, as well as the pull-down mechanism to advance the film step-by-step, may also be similar to those mechanisms of the first embodiment. However, the shutter mechanism is different, the pivoted supporting arms for the projector supply and take-up reels and drive of spindles thereof are different, and the means for driving the mechanisms on projector operation, as well as base unit features, are different in the second embodiment from those in the first embodiment.

In the second embodiment, illustrated in Figs. 33 to 44 inclusive, a common shutter device is employed both for taking pictures in camera operation and for projecting pictures in projector operation. Such common shutter means 275 will be best understood by reference to Figs. 35, 36 and 37. As therein shown, the front of the camera is provided with a cupped chamber plate 276 having a recess 277 therein, preferably substantially cylindrical, as in the first embodiment, and covered by a like circular cover plate 60 pivotally to support a similar lens turret 61, with the cover plate closing off the circular recess 277 to provide a closed front chamber in which the shutter mechanism 275 is housed. The front end of the main drive shaft 257 extends through the rear wall of the front chamber 277, i.e., plate 276, to carry in this chamber a spur gear 278 fixed thereto for drive thereby. Spur gear 278 is constantly in mesh with a second spur gear 279, rotatably supported upon a swinging arm 280 which is pivoted about the axis of the drive shaft 257 to form a sun and planet gear mechanism. The planet spur gear 279 is rotatably supported on the swinging arm 280 by means of a stub shaft 281 which carries on its outer end a circular shutter plate 282 fixed to planet gear for rotation thereby. The front wall structure, including cupped plate 276, slidably supports for axial movement a shift pin 283 and, as is best seen in Fig. 36, the outer end 284 of that pin is adapted to be abutted by the inner face of the cover panel 251 to push its nose 285 against the right side of swinging lever 280 (as viewed from a point in front of the camera) against the biasing force of a spring 286. As a result, the spring 286 biases the swinging lever arm 280 to the right (as viewed in Figs. 35 and 36 from a point in front of the apparatus) to the position indicated in Fig. 35. If desired, the pin 283 may be fixed to the inner wall of the cover panel 251 and inserted through a hole in the side wall of cupped plate 276 with mount of the cover panel 251. When the side cover panel 251 is mounted to the rest of the casing structure of the device 250, pin 283 is pushed axially to the left as viewed in Fig. 36 so as to swing the lever arm 280 to the position therein indicated against the biasing force of spring 286. As a result, the shutter stub shaft 281 is swung by spring 286 to the position indicated in Fig. 35 when the cover panel 251 is removed and is swung back to the position indicated in Fig. 36 when the cover panel is replaced, and the first may be considered the projection position while the second may be considered the camera position thereof.

The shutter plate 282, fixed on shaft 281 for rotation thereby, has two circular zones. Preferably in the inner zone are symmetrically arranged three arcuate cut-outs in the form of slots 287—287, each of which extends about 60° with plate structure intervening any two thereof forming light cutoff shutter vane structure also extending about 60°. Preferably the second zone is located marginally of the circular shutter plate 282 radially beyond the zone in which the three slots 287—287 are located and has an arcuate cut-out portion thereof extending about 180° to provide cut-back notch 288. Thus, the series of three arcuate slots 287—287 and intervening shutter plate structure constitute the shutter means for projection operation to be rotated in a path including the aperture 162, as shown in Fig. 35, when the side cover panel 251 is removed and the device conditioned for projector operation. When the side cover panel 251 is replaced, as proposed in Fig. 36, so that the shutter plate 282 is swung to the left to the camera position, it will be seen that the cut-back notch 288 rotates in a path across the aperture 162 for camera operation. Accordingly, the light beam in the common optical path to and from the optical window or aperture 162 is intercepted three times during one rotation of the main drive shaft 257 by vanes, each extending about 60°, and is intercepted on camera operation only once during each revolution of the main drive shaft by a vane extending about 180°. It has been found that these are ideal conditions for taking and projecting pictures and that such shutter means reduces flicker to a minimum in projection, as indicated in the U.S. Patent to Lovejoy 1,536,347. However, unlike the proposal of that patent, the present shutter mechanism does not require separate optical windows and paths for camera and projector operation. The advantages are attained by much simplified construction which is practical to manufacture and service.

As will be seen from Figs. 34, 38, 39 and 41, the rear pulley 269 carries on the back side thereof a drum 289 of an over-running ball clutch device which freely rotates about a stepped cylindrical clutch core 290 constituting the shaft about which pulley 269 is freely rotatable in the clockwise direction as viewed in Fig. 38, but which is locked thereto when rotated counterclockwise, as viewed in Figs. 34 and 38. Thus, when belt 266 travels forward from the rear pulley 269 to the front pulley 268 along the upper run thereof, the core shaft 290 which is rotatably supported by longitudinal partition 583, is rotated counterclockwise, all as viewed in Fig. 34, to rotate in the same direction outer driving pulley 291, about which is lapped a spring belt 292, in turn trained about a pulley fixed on projector take-up reel spindle 293, to rotate the latter as it is supported on the upper end of an upwardly-extending swinging arm 294.

As will be understood from Figs. 34, 38, 39 and 43, the front pulley 268 also carries an over-running clutch drum 295 rotating about the axis of the other element of this second clutch device consisting of a sleeve 296 rotatably mounted on shaft 297 pivoted to partition 583. The parts of the over-running clutch device of the front pulley 268 are reversed from those of the clutch device of the rear pulley 269. Thus when the top run of the belt 266 is travelling forward, as viewed in Fig. 34, the clutch device of the front pulley 268 is declutched so as not to drive the core sleeve 296 and with that clutch pulley also rotating counterclockwise, as viewed in Fig. 34, or clockwise, as viewed in Fig. 38. The over-running clutch devices may be mounted on either side of the longitudinal partition 583 as desired, with suitable rearrangement and order of parts assembled therewith.

As will be seen from Fig. 43, the clutch sleeve 296 carries fixed thereto a sheave 298 to drive a looped belt 299 which is lapped up over a pulley fixed to the supply reel spindle 300 carried by the upper end of outwardly-extending pivoted arm 301. Accordingly, when take-up reel 302 on spindle 293 is driven in the counterclockwise direction, as viewed in Fig. 39, to reel up thereon single-width film 209, the supply reel 303 on spindle 300 is not driven and, if desired, may be braked by any suitable means well known in the art, such as drag felts. On the other hand, if the drive of the mechanism be reversed, the clutch of the rear pulley 269 will be declutched so that the rear projector reel 302 will not be driven and the front pulley 268 will be clutched so that the front projector reel 303 will be driven in a counterclockwise direction for rewind.

As indicated in the broken-away portions of Fig. 33 and in Fig. 34, a rabbeted flange 304 of the casing structure, with which the edge of side cover panel 251 snugly fits for light-tight closure of the left side chamber 84, may be cut back along the top thereof to provide for free outward swing of the two reel supporting arms 294 and 301 and to provide an abutment 305 at the rear for limiting the backward swing of the rear arm 294. A projection 306 on the flange 304 at the front top corner may serve a like stop function in forward swing of the front pivoted arm 301. As indicated in dotted lines in Fig. 39, the arms 294 and 301 fold down into the chamber 84 to be housed within the casing of the device 250 during camera operation.

As will be seen from Figs. 39 and 43, the front reel-supporting arm 301 is fixed upon the core shaft 297 which extends axially through the over-running clutch core sleeve 296 to the far side of the partition 583, there to carry a crank arm 307 having an outwardly-extending pin 308, which is disposed in a horizontal slot 309 in a vertically-slidable guided blind panel 310 selectively to cover and uncover the optical path hole 141 in the partition 583 between the light source chamber and the left side chamber 84. Thus, when the reel supporting arm 301 is folded down into the chamber 84, as indicated in dot-dash lines in Fig. 39, the blind side panel 310 is lowered to cover the optical path hole 141, which is the function of the shutter blind arm 139 in the first embodiment. When the reel-supporting arm 301 is swung up and forward to the extended position shown in full lines in Fig. 39 for projector operation, the crank arm 307 lifts the blind panel 310 to uncover the hole 141 to permit light rays to pass from the light source to the oblique mirror for reflection forward through the developed single-width film on projection operation.

A vertical slot 311 in the partition 583 slidably receives therein a pin 312 fixed on the blind slide panel 310 and the pin 311 rotatably supports tension idler 267, which is disposed beneath a bottom run of the belt 266, as will be understood from Fig. 34. Thus, in camera operation with the reel-supporting arm 301 folded down within the encased unit 250, the belt 266 is slacked off so that there will be no drive of the front and rear pulleys 268 and 269; but when the side cover panel 251 is removed and the arm 301 is swung up to the position indicated in Fig. 39 for projector operation, the idler 267 is raised by the blind slide panel 310 so as to tighten the belt 266 for drive of the front and rear pulleys 268 and 269.

It will be noted from Figs. 39, 40 and 42 that when the second embodiment of the camera-projector apparatus 250 is conditioned for projector operation, it is mounted upon a base unit 313 having some similarity to the base unit 214 of the first embodiment. Base unit 313 houses blower 219 and its driving AC motor 218 which, as will be seen from Figs. 40 and 42, carries a beveled gear 314 on one end of its shaft meshed with a beveled gear 315 fixed on a vertical shaft 316 which extends up through the top of the base unit casing, there to carry a slotted and tapered driving socket 317 as a part of a coupler. The motor rotor 254 carries a downwardly-extending shaft extension 318 which carries on its lower end a fined and tapered driving head 319, adapted as another part of the coupler to be socketed in driving head 317 for drive by the latter. Thus, D.C. motor 253 is not intended to serve any function in projector operation since the main drive shaft 257 will be driven by worm gear 256, worm 255 and the rotor shaft extension 318 from the drive socket 317, in turn driven by the base unit motor 218, which also operates the fan or blower 219. Switch 320 on the side of the base unit 313 is of the double-pole, double-throw, reversing type, as will be understood from the circuit diagram of Fig. 44. The cable 224 which carries connector terminals 228 and 229 for energization of the lamp 197 has only two conductors so that the male terminals 110 and 112 of the connector 111 in the camera unit may be free. Terminals 110 and 112 need not be employed for projector operation of the motor 253 as the mechanism in the camera-projector unit 250 is mechanically driven from the base unit motor 218 during the projection of pictures. However, the wiring in the camera may be altered slightly by connecting the wire 113 leading from the male terminal 112 to the switch leaf 107 and the motor terminal wire 114; also, the male terminal 110 may be connected by wire 109 to the switch leaf 106. As a result, male terminals 110 and 112 are in parallel with the D.C. switch leaves 106 and 107 so that, if desired, during camera operation the D.C. circuit in the camera may be closed for operation of the D.C. motor 253 by a remote control circuit closing switch cable plugged in to connection of the circuit connector 111 for connecting a remote control switch across the terminals 110 and 112.

In Fig. 42 is shown a modified form of elevating means for adjusting the tilt of the camera-projector unit 250 relative to the supporting surface 240 and, as there shown, may comprise an elevating screw 321 to raise the back end of base unit 313. It is also proposed in Fig. 42 that the outlet duct or tube 220, which supplies cooling air from the fan 219, may have a flexible mount to the encased camera unit 250 rather than a solid connection, such as the bayonet joint proposed in the first embodiment. This may be accomplished by providing an elastic flexible gasketing ring 322 inside the casing about the hole 221 in the bottom panel thereof snugly to receive the fan eduction tube 220; and this flexible connection is desirable since proper alignment of the shafts 316 and 318 should be attained for efficient drive operation thereof without any tendency to cramp the bearings or coupling connection at the drive head 317. The hole 221 may, if desired, be temporarily closed by flexible shutter means receptive of duct 220 in lieu of gasketing ring 322 to provide a similar flexible connection.

Operation of the embodiment of Figs. 33 to 44 inclusive on camera operation is obvious from the preceding description with the common shutter mechanism conditioned as indicated in Fig. 36 and with the double-width film fed between the fixed aperture plate and the gate plate as in the preceding embodiment, from the loosely pivoted supply reel-spindle 270 down to the driven camera take-up reel-spindle 265. The path of the film, however, between the supply reel and the gate and between the latter and the take-up reel will be somewhat different. As will be seen from Fig. 39 (showing this embodiment conditioned for projection operation), the slide plate 150 carries three film-biasing rolls 323, 324 and 325, which will snug up against the film driving sprocket 261, the shaft of which extends through a large hole in the biased plate 150, when the latter is released to its forward position. On camera operation, the double-width film will be fed from the supply reel on spindle 270 to between the roll 325 and sprocket 261, then upward to pass down between the fixed aperture plate and the gate plate, thereafter upward to between the feed sprocket 261 and successively the rolls 323 and 324, and finally down to the take-up reel on the driven spindle 265.

In operation of the embodiment of Figs. 33 to 44 inclusive on projector operation, the side cover panel 251 is removed to permit the shutter mechanism to swing to the position shown in Fig. 35 and the arms 294 and 301 are swung upwardly out of the case to the full line positions shown in Fig. 39, there to support projector supply reel 303 and projector take-up reel 302 and with the single-width film extending therebetween substantially along the path illustrated in Fig. 39 with lap over the camera supply spindle 270. The reversing switch 320 is employed to rotate the A.C. motor 218 in one direction for advance of the film through the projector from the supply reel 303 to the take-up reel 302 and the film, as it is accumulated on the supply reel, may then be rewound upon the supply reel with reversal of operation of the motor 218 by manipulation of the reversing switch.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. In a camera-projector adapted to handle on camera operation double width film having a pair of image zones flanking opposite sides of the film center line and on projector operation single width film having a single central zone of successive image-bearing frames, the combination comprising relatively fixed film track means against which the emulsion face of the film is to be moved, biased movable pressing means to define with said relatively fixed means a film path therebetween and to press said film against said relatively fixed means by contact of the back slick face of the film, said relatively fixed and pressing means being so formed at aligned localities about midway between opposite edges of the film path to permit at least one film biasing-guide element to extend across the film path from the side toward which the film emulsion face is to face, at least one elongated film biasing-guide element having contact means of narrow width for substantial line contact of film movably mounted to the mentioned side of the film path at the midway aligned localities and extending across the film path in the absence of double width film thereat, and means tending to move said biasing-guide element toward said pressing means for substantial center line contact by its contact means of the emulsion face of a double width film as it is moved along the film path to apply biasing force to the film in opposition to the pressure of said pressing means to reduce film drag of the emulsion face against said relatively fixed film track means, said film biasing-guide element being so formed as to provide by side structure thereof a side guide for an edge of the single width film when said element is permitted to move to its extending position across the film path in the absence of film between said element and said biased pressing means under the urging of said element moving means.

2. In a camera-projector adapted to handle on camera operation unexposed double width film having a pair of image zones flanking opposite sides of the film center line and on projector operation developed single width film having a single central zone of successive image-bearing frames, the combination comprising a fixed aperture wall means against which the emulsion face of the film is to be dragged, a biased movable gate plate to define with said wall means a film path therebetween and to press said film against said wall means by contact of the back slick face of the film, portions of said wall means and gate plate being removed at aligned localities about midway between opposite edges of the film path for reception of at least one film baising-guide finger across the film path from the side toward which the film emulsion face is to face, means biasing said gate plate toward said wall means with predetemrined pressure, at least one film biasing-guide finger having a tip portion of narrow width for substantial line contact of film movably mounted to the mentioned side of the film path at the midway aligned localities and extending across the film path in the absence of double width film thereat, and means tending to move said biasing-guide finger inward toward said gate plate for contact of its tip portion against the film emulsion face of a double width film as it moves along the film path substantially at the center line of the film and to bias the latter in opposition to the pressure thereon of said gate plate to reduce drag of the emulsion face of said double width film against said wall means, said finger being so formed as to provide by side structure thereof a side guide for an edge of the single width film when said finger is permitted to move to its extending position across the film path in the absence of film between said finger and said biased gate plate under the urging of said finger moving means.

3. The camera-projector structure as defined in claim 2 characterized by said film biasing-guide finger being biased in opposition to the biasing of said gate plate for reduction of the over all drag on the film emulsion face, said finger having its film edge guiding side structure positioned across the film path substantially in the position of its film face contact means when single width film is moved along the film path to guide one edge of the single width film for confining its movement substantially to the path of movement of one longitudinal half of the double width film constituting one of the pair of image zones thereof.

4. The camera-projector structure as defined in claim 3 characterized by said aperture wall means having a receptive light beam aperture of certain dimensions successively to expose a series of frames in one longitudinal half of the double width film, and said gate plate having a transmitting light beam aperture substantially aligned with the receptive light beam aperture of slightly less dimensions than the dimensions of the receptive light beam aperture.

5. In a camera-projector adapted to handle on camera operation unexposed double width film having a pair of image zones flanking opposite sides of the film center line and on projector operation developed single width film having a single central zone of successive image-bearing frames, the combination comprising a fixed aperture wall means against which the emulsion face of the film is to be dragged, a biased movable gate plate to define with said wall means a film path therebetween and to press said film against said wall means by contact of the back slick face of the film, portions of said wall means and gate plate being removed at aligned localities about midway between opposite edges of the film path for reception of at least one film biasing-guide finger across the film path from the side toward which the film emulsion face is to face, means biasing said gate plate toward said wall means with predetermined pressure, movable support means swingably mounted at a point to the front side of the film path toward which the unexposed emulsion film side faces and for swing in and out along a path generally normal to the plane of the film path, means biasing said swingable support means toward the film path, a film biasing-guide finger mounted on said biased support means to be swung thereby through an arc generally transversely across the film path, said finger having a nose for drag in one position substantially along the center line of the double width film and which is swung across the film path along the arc to a second position at one side of the center line when double width film is absent from the film path, said finger also having side guide means which is swung with said nose substantially to the first center line position of said nose for guiding a side edge of the single width film when said nose is swung to its second position.

6. The camera-projector structure as defined in claim 5 characterized by the provision of said finger and swingable support means as an arm structure having a support portion pivotally mounted to the front of said aperture wall means and laterally of the film track center line, said arm structure including as the finger a tip portion extending angularly from said support portion and terminating in said drag nose with said guide means being provided on the far side of said tip portion.

7. The camera-projector structure as defined in claim 6 characterized by said tip portion extending laterally from and generally normal to said support portion of said arm structure, said biasing means being spring means.

8. The camera-projector structure as defined in claim 7 characterized by said arm structure being in the form of an L-shaped piece of wire with a section of the support portion thereof having said spring-biasing means associated therewith.

9. The camera projector structure as defined in claim 8 characterized by said arm structure being in the form of a piece of spring wire having the associated spring-biasing means in the form of at least one coil turn incorporated in the support portion thereof with a part of said support portion to one end of said turn being fixedly anchored and the remaining part of the support portion to the other end of said turn extending tangentially from said turn whereby the axis of said turn constitutes the swinging axis of said swingable support means.

10. The camera projector structure as defined in claim 8 characterized by the provision of a spaced pair of said film biasing-guide fingers and swingable support means with their pair of drag noses spaced substantially along the film path center line and located respectively above and below the aperture in said wall means to provide two double width film-contacting means serving as a spaced pair of film edge guide means for single width film.

11. In a motion picture camera-projector apparatus windowed track and gate means defining a film path along which double width unexposed film and single width developed film are to be intermittently pulled down frame-by-frame, said gate means including film pressing means to apply pressure to the film biasing it against said track means, said track and gate means having two sets of aligned holes extending therethrough spaced longitudinally along the center line of the film path, and a pair of spring-biased film biasing-guide fingers each located on the track means side of the film path and aligned with one of said sets of aligned holes for projection thereinto in the absence of a film on the path, each of said fingers having a nose for drag contact along the center line of the double width film when the latter is moved along the path to bias the film in opposition to the pressure of said gate means thereon to reduce film drag along said track means, each of said spring-biased fingers having film edge-guide means along one side thereof to be positioned by inward motion of said finger across the film path in the absence of the double width film from the latter substantially at the previous drag location of the nose of this finger to guide one edge of the single width film along the center line of the film path where the single width film is moved along the path.

12. The camera-projector structure as defined in claim 11 characterized by the provision of said fingers and their film edge-guide means as swinging tip portions of a pair of swingable arm structures mounted forward of said track means, each of said arm structures having a support portion from one end of which said tip portion angularly extends toward the film path with each support portion having its other end fixedly supported, the spring biasing of each finger being provided by spring means associated with said support portion thereof for effecting the inward motion of the finger tip portion carried thereby.

13. The camera-projector structure as defined in claim 12 characterized by the provision of each of said swingable arm structures as a length of spring wire with the spring means associated therewith being in the form of a coil constituting a section thereof and the tip portion being bent substantially normal to the part intervening it and the coil.

References Cited in the file of this patent

UNITED STATES PATENTS

| | | |
|---|---|---|
| 1,369,694 | Mladinich et al. | Feb. 22, 1921 |
| 1,377,322 | DeTartas et al. | May 10, 1921 |
| 1,397,817 | Mladinich | Nov. 22, 1921 |
| 1,466,774 | Wassilieff | Sept. 4, 1923 |
| 1,522,395 | Thomas | Jan. 6, 1925 |
| 1,536,347 | Lovejoy | May 5, 1925 |
| 1,673,120 | Oiler | June 12, 1928 |
| 1,802,045 | Bogopolsky | Apr. 21, 1931 |
| 1,859,435 | De Forest | May 24, 1932 |
| 1,898,173 | Dina | Feb. 21, 1933 |
| 1,911,845 | Owens | May 30, 1933 |
| 1,955,938 | Berkowitz | Apr. 24, 1934 |
| 2,008,033 | Nystrom | July 16, 1935 |
| 2,049,944 | Carpenter | Aug. 4, 1936 |
| 2,067,893 | De Vry | Jan. 19, 1937 |
| 2,087,250 | Foster | July 20, 1937 |
| 2,093,769 | Zillger | Sept. 21, 1937 |
| 2,148,493 | Nowland | Feb. 28, 1939 |
| 2,168,941 | Marks | Aug. 8, 1939 |
| 2,186,618 | Philips | Jan. 9, 1940 |
| 2,207,075 | Sperry | July 9, 1940 |
| 2,213,768 | Merriman et al. | Sept. 3, 1940 |
| 2,226,175 | Merriman et al. | Dec. 24, 1940 |
| 2,253,258 | Widmer | Aug. 19, 1941 |
| 2,256,899 | Greenwood | Sept. 23, 1941 |
| 2,343,850 | Fairbanks et al. | Mar. 7, 1944 |
| 2,440,966 | Moomaw | May 4, 1948 |
| 2,506,765 | Bach | May 9, 1950 |

FOREIGN PATENTS

| | | |
|---|---|---|
| 706,777 | France | Mar. 21, 1931 |

UNITED STATES PATENT OFFICE
CERTIFICATE OF CORRECTION

Patent No. 2,912,898

November 17, 1959

John W. Oxberry

It is hereby certified that error appears in the printed specification of the above numbered patent requiring correction and that the said Letters Patent should read as corrected below.

Column 7, line 52, for "As it" read -- As is --; column 18, line 61, for "side" read -- slide --; column 23, line 8, for "where" read -- when --.

Signed and sealed this 10th day of May 1960.

(SEAL)
Attest:

KARL H. AXLINE
Attesting Officer

ROBERT C. WATSON
Commissioner of Patents